(12) United States Patent
Sussman et al.

(10) Patent No.: US 12,380,469 B2
(45) Date of Patent: *Aug. 5, 2025

(54) METHOD, APPARATUS, AND COMPUTER PROGRAM PRODUCT FOR PREDICTING WEB BROWSING BEHAVIORS OF CONSUMERS

(71) Applicant: Bytedance Inc., Wilmington, DE (US)

(72) Inventors: Michael Sussman, Mountain View, CA (US); Jesse Pinho, Berlin (DE); Michael Hines, Chicago, IL (US); Jim Challenger, Chicago, IL (US); David Hanley, Salt Lake City, UT (US); Isaac Sanders, Chicago, IL (US); Dean Marano, Grand Rapids, MI (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,911

(22) Filed: Feb. 21, 2024

(65) Prior Publication Data

US 2024/0281848 A1    Aug. 22, 2024

Related U.S. Application Data

(63) Continuation of application No. 17/557,763, filed on Dec. 21, 2021, now Pat. No. 11,941,661, which is a continuation of application No. 16/845,617, filed on Apr. 10, 2020, now Pat. No. 11,238,496, which is a continuation of application No. 15/280,738, filed on Sep. 29, 2016, now Pat. No. 10,740,793.

(60) Provisional application No. 62/235,142, filed on Sep. 30, 2015.

(51) Int. Cl.
| | |
|---|---|
| *G06Q 30/02* | (2023.01) |
| *G06Q 30/0241* | (2023.01) |
| *G06Q 30/0251* | (2023.01) |
| *G06F 16/835* | (2019.01) |

(52) U.S. Cl.
CPC ..... *G06Q 30/0255* (2013.01); *G06Q 30/0277* (2013.01); *G06F 16/835* (2019.01)

(58) Field of Classification Search
CPC .................................................. G06F 16/835
See application file for complete search history.

(56) References Cited

U.S. PATENT DOCUMENTS

| | | |
|---|---|---|
| 5,870,559 A | 2/1999 | Leshem et al. |
| 8,311,973 B1 | 11/2012 | Zadeh |
| 8,862,534 B1 | 10/2014 | Faratin et al. |

(Continued)

*Primary Examiner* — Vincent M Cao
(74) *Attorney, Agent, or Firm* — ALSTON & BIRD LLP

(57) ABSTRACT

Embodiments of the present invention provide methods, systems, apparatuses, and computer program products for predicting consumer behavior. In one embodiment a method is provided comprising automatically creating a link graph comprising nodes representing webpages, links representing hyperlinks, and weights for each link representing a number of times a hyperlink associated with the respective link redirected the a user devices from a webpage associated with a first node connected to the link to a webpage associated with a second node connected to the link; and determining based on the link graph a programmatically expected path for a particular user, wherein the programmatically expected path identifies, at least, two or more webpages that the particular user is programmatically expected to visit and specifying a programmatically expected order at which the particular user will visit the webpages.

20 Claims, 13 Drawing Sheets

(56) References Cited

U.S. PATENT DOCUMENTS

| | | | |
|---|---|---|---|
| 8,880,996 | B1 | 11/2014 | Deshpande et al. |
| 10,740,793 | B1 | 8/2020 | Sussman et al. |
| 2003/0115333 | A1 | 6/2003 | Cohen et al. |
| 2005/0044178 | A1 | 2/2005 | Schweier |
| 2005/0262240 | A1 | 11/2005 | Drees et al. |
| 2006/0253458 | A1 | 11/2006 | Dixon et al. |
| 2008/0010166 | A1 | 1/2008 | Yang et al. |
| 2009/0327424 | A1 | 12/2009 | Bernstein et al. |
| 2010/0076910 | A1 | 3/2010 | Gao et al. |
| 2011/0022450 | A1 | 1/2011 | Meredith |
| 2011/0054999 | A1 | 3/2011 | Attenberg et al. |
| 2012/0066371 | A1 | 3/2012 | Patel et al. |
| 2012/0209661 | A1 | 8/2012 | Bennett et al. |
| 2012/0284340 | A1 | 11/2012 | Young |
| 2012/0303606 | A1 | 11/2012 | Cai et al. |
| 2013/0246383 | A1 | 9/2013 | White et al. |
| 2014/0282541 | A1 | 9/2014 | Perlegos et al. |
| 2016/0188542 | A1 | 6/2016 | Burkard et al. |

177.21.3.4 - - [04/Apr/1999:00:01:11 +0100] "GET /studaffairs/ccampus.html HTTP/1.1" 200 5327 "http://www.ulst.ac.uk/studaffairs/accomm.html" "Mozilla/4.0 (compatible; MSIE 4.01; Windows 95)"

| Page↓ \ Page→ | 1 | 2 | 3 | 4 | 5 | 6 | 7 | 8 | 9 | 10 | 11 | 12 | Exit | Start |
|---|---|---|---|---|---|---|---|---|---|---|---|---|---|---|
| 1 |  | 0.2 | 0.3 | 0.5 |  |  |  |  |  |  |  |  |  |  |
| 2 |  |  | 0.111 |  | 0.489 | 0.4 |  |  |  |  |  |  |  |  |
| 3 |  |  |  |  |  |  | 0.253 | 0.747 |  |  |  |  |  |  |
| 4 |  |  | 0.067 |  |  |  |  |  | 0.4 | 0.533 |  |  |  |  |
| 5 |  |  |  |  |  |  |  |  |  | 1.0 |  |  |  |  |
| 6 |  |  |  |  |  |  | 0.1 |  |  | 0.9 |  |  |  |  |
| 7 |  |  |  |  |  |  |  |  |  | 0.68 |  | 0.32 |  |  |
| 8 |  |  |  |  |  |  |  |  |  |  | 1.0 |  |  |  |
| 9 |  |  |  |  |  |  |  |  |  |  | 1.0 |  |  |  |
| 10 |  |  |  |  |  |  |  |  |  |  | 1.0 |  |  |  |
| 11 |  |  |  |  |  |  |  |  |  |  |  | 1.0 |  |  |
| 12 |  |  |  |  |  |  |  |  |  |  |  |  | 1.0 |  |
| Exit |  |  |  |  |  |  |  |  |  |  |  |  |  | 1.0 |
| Start | 1.0 |  |  |  |  |  |  |  |  |  |  |  |  |  |

FIG. 6B

| Page↓ \ Page→ | 1 | 2 | 3 | 4 | 5 | 6 | 7 | 8 | 9 | 10 | 11 | 12 | Exit | Start |
|---|---|---|---|---|---|---|---|---|---|---|---|---|---|---|
| 1 | 0.00 |  |  |  |  |  |  |  |  |  |  |  |  |  |
| 2 | 0.58 | 0.00 |  |  |  |  |  |  |  |  |  |  |  |  |
| 3 | 1.29 | 0.21 | 0.00 |  |  |  |  |  |  |  |  |  |  |  |
| 4 | 1.24 | 0.00 | 0.36 | 0.00 |  |  |  |  |  |  |  |  |  |  |
| 5 | 1.31 | 0.57 | 0.74 | 0.99 | 0.00 |  |  |  |  |  |  |  |  |  |
| 6 | 1.14 | 0.53 | 0.60 | 0.89 | 0.00 | 0.00 |  |  |  |  |  |  |  |  |
| 7 | 1.04 | 0.51 | 0.81 | 0.83 | 0.26 | 0.24 | 0.00 |  |  |  |  |  |  |  |
| 8 | 1.71 | 0.63 | 1.17 | 1.20 | 1.18 | 1.04 | 0.18 | 0.00 |  |  |  |  |  |  |
| 9 | 1.14 | 0.53 | 0.75 | 0.89 | 0.88 | 0.80 | 0.51 | 0.00 | 0.00 |  |  |  |  |  |
| 10 | 1.39 | 0.58 | 0.87 | 1.03 | 1.02 | 0.91 | 0.58 | 0.00 | 0.00 | 0.00 |  |  |  |  |
| 11 | 2.88 | 0.74 | 1.61 | 1.68 | 1.64 | 1.38 | 0.89 | 2.32 | 1.39 | 1.77 | 0.00 |  |  |  |
| 12 | 2.00 | 0.67 | 1.29 | 1.33 | 1.31 | 1.14 | 0.71 | 0.00 | 0.00 | 0.00 | 2.88 | 0.00 |  |  |
| Exit | 3.25 | 0.76 | 1.72 | 1.79 | 1.75 | 1.46 | 1.31 | 2.55 | 1.46 | 1.90 | 5.98 | 3.25 | 0.00 |  |
| Start | 2.00 | 0.67 | 1.29 | 1.33 | 1.31 | 1.14 | 1.04 | 1.71 | 1.14 | 1.39 | 2.88 | 2.00 | 3.25 | 0.00 |

FIG. 6C

Compressed state 4 into state 2 (similarity 0.000000)(states: 2 4)
Compressed state 6 into state 5 (similarity 0.000000)(states: 5 6)
Compressed state 9 into state 8 (similarity 0.000000)(states: 8 9)
Compressed state 12 into state 10 (similarity 0.000000)(states: 10 12)
Compressed state 10 into state 8 (similarity 0.000000)(states: 8 9 10 12)
Finished compression.
Have compressed 14 states to 9.

FIG. 6D

| $_{Page}\backslash^{Page}$ | 1 | (2,4) | 3 | (5,6) | 7 | (8,9,10,12) | 11 | *Exit* | *Start* |
|---|---|---|---|---|---|---|---|---|---|
| 1 | | 0.7 | 0.3 | | | | | | |
| (2,4) | | | 0.08 | 0.25 | | 0.67 | | | |
| 3 | | | | | 0.25 | 0.75 | | | |
| (5,6) | | | | | 0.04 | 0.96 | | | |
| 7 | | | | | | | 0.68 | 0.32 | |
| (8,9,10,12) | | | | | | | | 1.0 | |
| 11 | | | | | 1.0 | | | | |
| *Exit* | | | | | | | | | 1.0 |
| *Start* | 1.0 | | | | | | | | |

FIG. 6E

METHOD, APPARATUS, AND COMPUTER PROGRAM PRODUCT FOR PREDICTING WEB BROWSING BEHAVIORS OF CONSUMERS

CROSS REFERENCE TO RELATED APPLICATIONS

The present application is a continuation of U.S. application Ser. No. 17/557,763, titled "METHOD, APPARATUS, AND COMPUTER PROGRAM PRODUCT FOR PREDICTING WEB BROWSING BEHAVIORS OF CONSUMERS," filed Dec. 21, 2021, which is a continuation of U.S. application Ser. No. 16/845,617, titled "METHOD, APPARATUS, AND COMPUTER PROGRAM PRODUCT FOR PREDICTING WEB BROWSING BEHAVIORS OF CONSUMERS," filed Apr. 10, 2020, which is a continuation of U.S. application Ser. No. 15/280,738, titled "METHOD, APPARATUS, AND COMPUTER PROGRAM PRODUCT FOR PREDICTING WEB BROWSING BEHAVIORS OF CONSUMERS," filed Sep. 29, 2016, now U.S. Pat. No. 10,740,793, which claims the benefit of and priority to U.S. Provisional Application Ser. No. 62/235,142, titled "METHOD, APPARATUS, AND COMPUTER PROGRAM PRODUCT FOR PREDICTING WEB BROWSING BEHAVIORS OF CONSUMERS," filed Sep. 30, 2015, the contents of all of which are incorporated by reference herein in their entirety.

BACKGROUND

A promotional and marketing service may utilize the internet to provide consumers with available promotions related to products, services or experiences offered by providers that may be of interest. Applicant has identified a number of deficiencies and problems associated with assessing and analyzing behaviors of consumers. Through applied effort, ingenuity, and innovation, many of these identified problems have been solved by developing solutions that are included in embodiments of the present invention, many examples of which are described in detail herein.

SUMMARY

This specification relates to assessing, analyzing, and predicting web browsing behaviors of consumers.

In general, one innovative aspect of the subject matter described in this specification can be embodied in methods and systems that include the actions of storing in a computer store data, for each of a plurality of webpages, specifying historical data associated with a respective webpage and a respective plurality of hyperlinks of the respective webpage; (i) wherein the data comprises data specifying traffic data for each respective webpage, the traffic data comprising (a) hyperlink traffic data specifying a count, for each respective hyperlink of the respective webpage, indicating the number of times the respective hyperlink was used during a pre-specified period and specifying a particular destination to which the hyperlink redirects user devices in response to user interactions with the hyperlink and (b) website traffic data specifying a count, for a first and a second webpages from the plurality of webpages, specifying a number of times that a user device was redirected from the first webpage to the second webpage based on a user interaction; (ii) wherein the data comprises data specifying historical data for a plurality of website users, wherein the historical data specifies, at least, (a) webpages of the website visited by each user, the order of visiting the webpages by each user, and (c) an amount of time each user spent visiting each webpage from the webpages; accessing the data at the computer store; (ii) automatically creating a link graph comprising (a) nodes representing webpages, (b) links representing hyperlinks, and (c) weights for each link representing the number of times the a hyperlink associated with the link redirected the user devices from a webpage associated with a first node connected to the link to a webpage associated with a second node connected to the link; (iii) accessing historical data for a particular website user; (iv) determining a programmatically expected path for the particular user, wherein the programmatically expected path identifies, at least, two or more webpages that the particular user is programmatically expected to visit and specifying a programmatically expected order at which the particular user will visit the webpages.

Other embodiments of this aspect include corresponding systems, apparatus, and computer programs, configured to perform the actions of the methods, encoded on computer storage devices.

These and other embodiments can each optionally include one or more of the following features. Determining that a similarity measure between the first and a second node meet a pre-specified configurable threshold and in response merge the first and the second nodes, wherein the similarity measure is based on in-link and out-link similarities between the first and second nodes, wherein the in-link similarities are indicative of a measure of similarity between nodes associated with webpages that users visited prior to visiting webpages associated with the first and second nodes, and wherein out-link similarities are indicative of a measure of similarity between nodes associated with webpages that users visited after visiting webpages associated with the first and second nodes.

These and other embodiments can each optionally include one or more of the following features. Filtering historical data for the particular user, wherein the filtering comprise: determining based on the historical data for the particular user that user visited a webpage associated with a first node at a first time; determining based on the historical data for the particular user that user visited the same webpage associated with the first node after the first time, wherein the user visited one or more webpages associated with nodes different from the first node after the first time and before visiting the same webpage after the first time; filtering the user visits to the same website associated with the first node after the first time and the user visits to the one or more webpages associated with the nodes different from the first node such that filtered visits are not available as historical data for the user.

These and other embodiments can each optionally include one or more of the following features. Determining that the particular user is at webpage associated with a first node; determining based on the link graph and historical data for the particular user, that the particular user is likely to be redirected to a second webpage associated with a second node based on user interactions; in response to determining that the particular user is likely to be redirected to a second webpage based on user interactions, performing a particular action. Determining based on the link graph that modification of the website layout increases the programmatically expected traffic to the website and in response performing the modification to particular webpages of the website. Providing one or more additional hyperlinks at a particular webpage, wherein the hyperlinks redirect user devices to a different webpage in response to user interactions. Removing one or more hyperlinks from a particular webpage, wherein the hyperlinks redirect user devices to a different webpage in response to user interactions. Determining based on the link graph that traffic to a website will meet a pre-specified configurable threshold, and in response modify the computer server. Determining an optimal number of processing servers for performing operations associated with maintaining the website based on the link graph and in response allocating the optimal number of servers for performing the operations associated with maintaining the website.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Provide accurate and efficient methods and systems for predicting behaviors of consumers during a pre-specified period. In turn, the predictions may be used to enhance, optimize and adjust marketing and advertising efforts. Reduce the cost associated with marketing and advertising efforts that are unlikely to result in purchases and, in turn, increase the overall revenue. Reduce the required processing power for servers. Similarly, reduction of the required processing power increases the overall revenue. Particular embodiments of the subject matter allow for optimizing website and/or webpage layouts such that consumer satisfaction is increased. Providing consumers with promotions at webpages that are likely to result in a maximized number of conversions and purchases. Generate additional traffic and additional sales through websites and in turn increase revenue.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
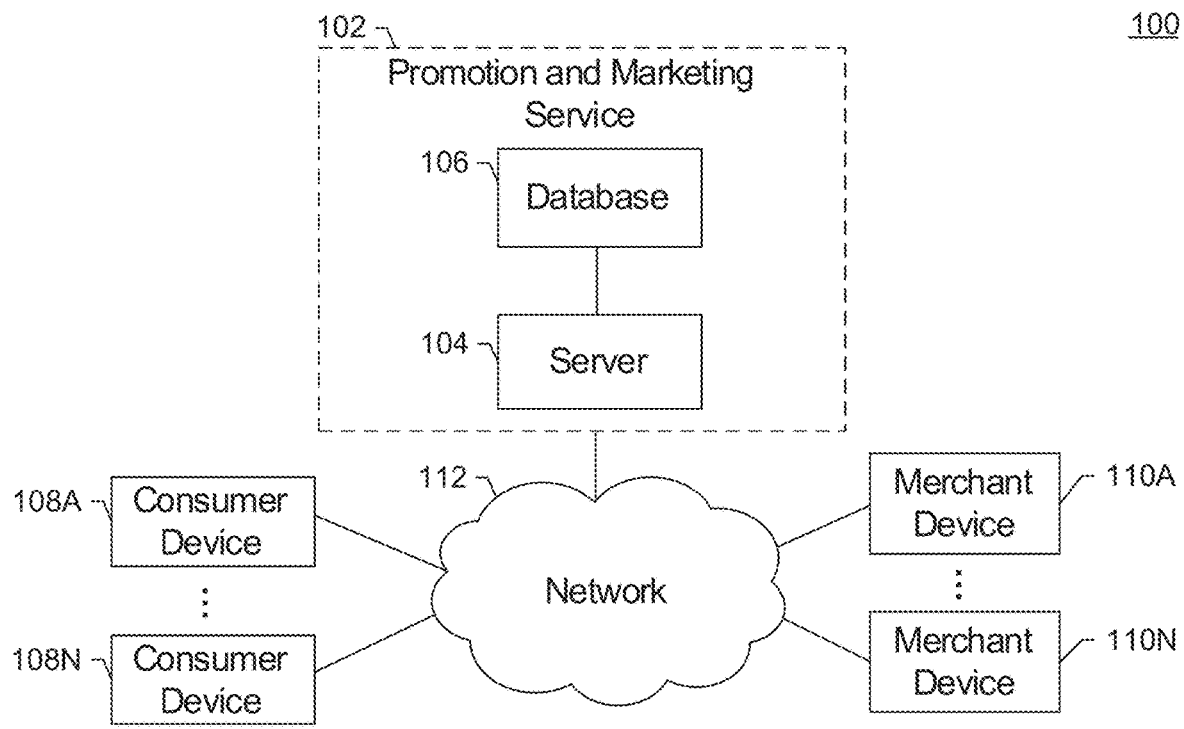
Figure 2:
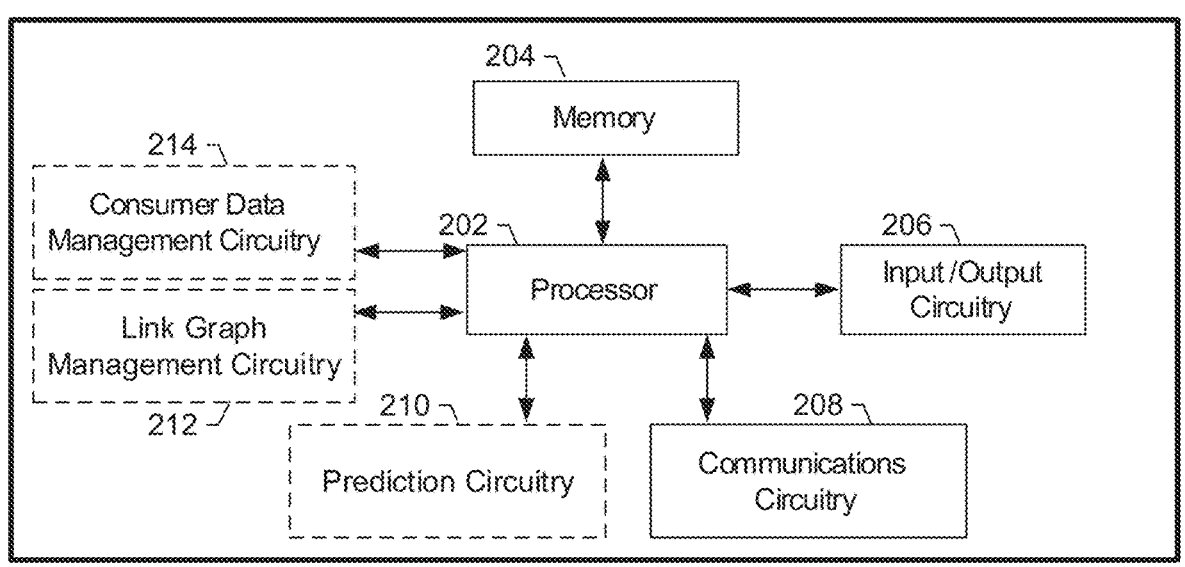
Figure 3:
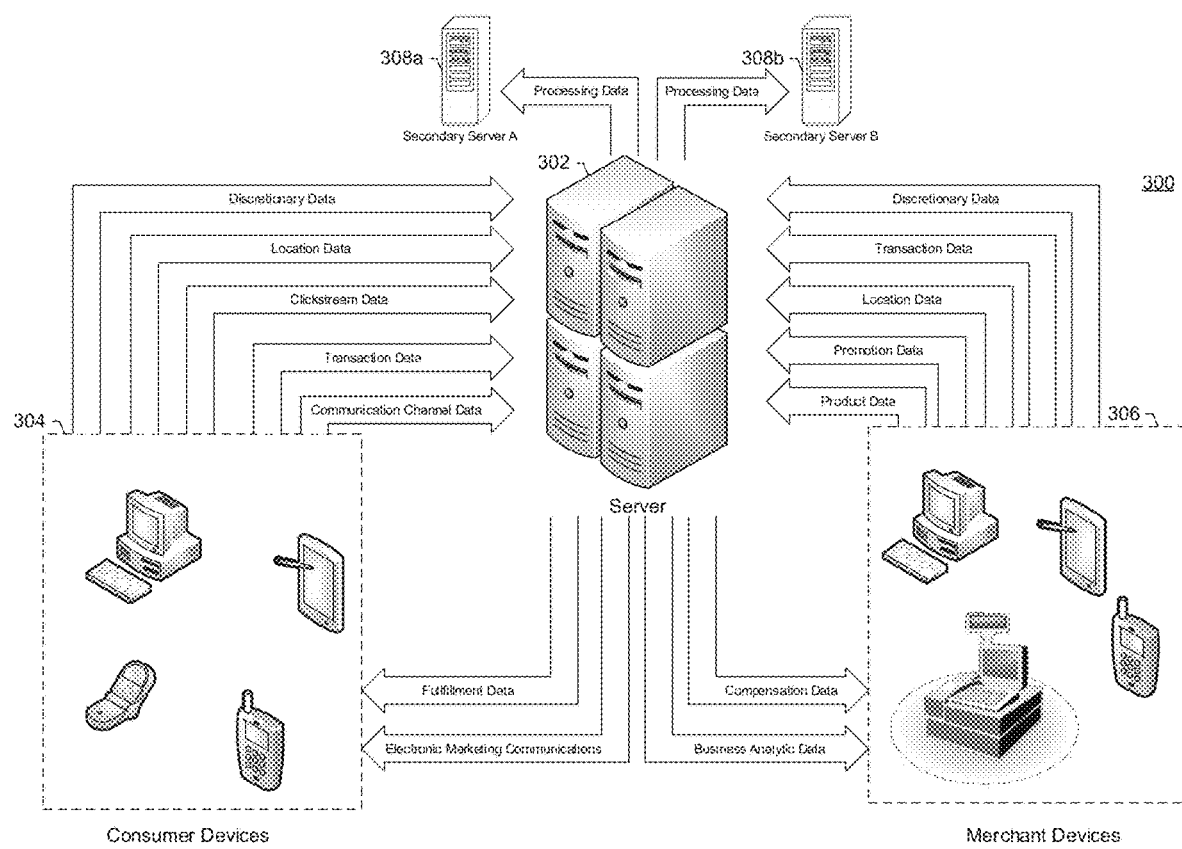
Figure 4:
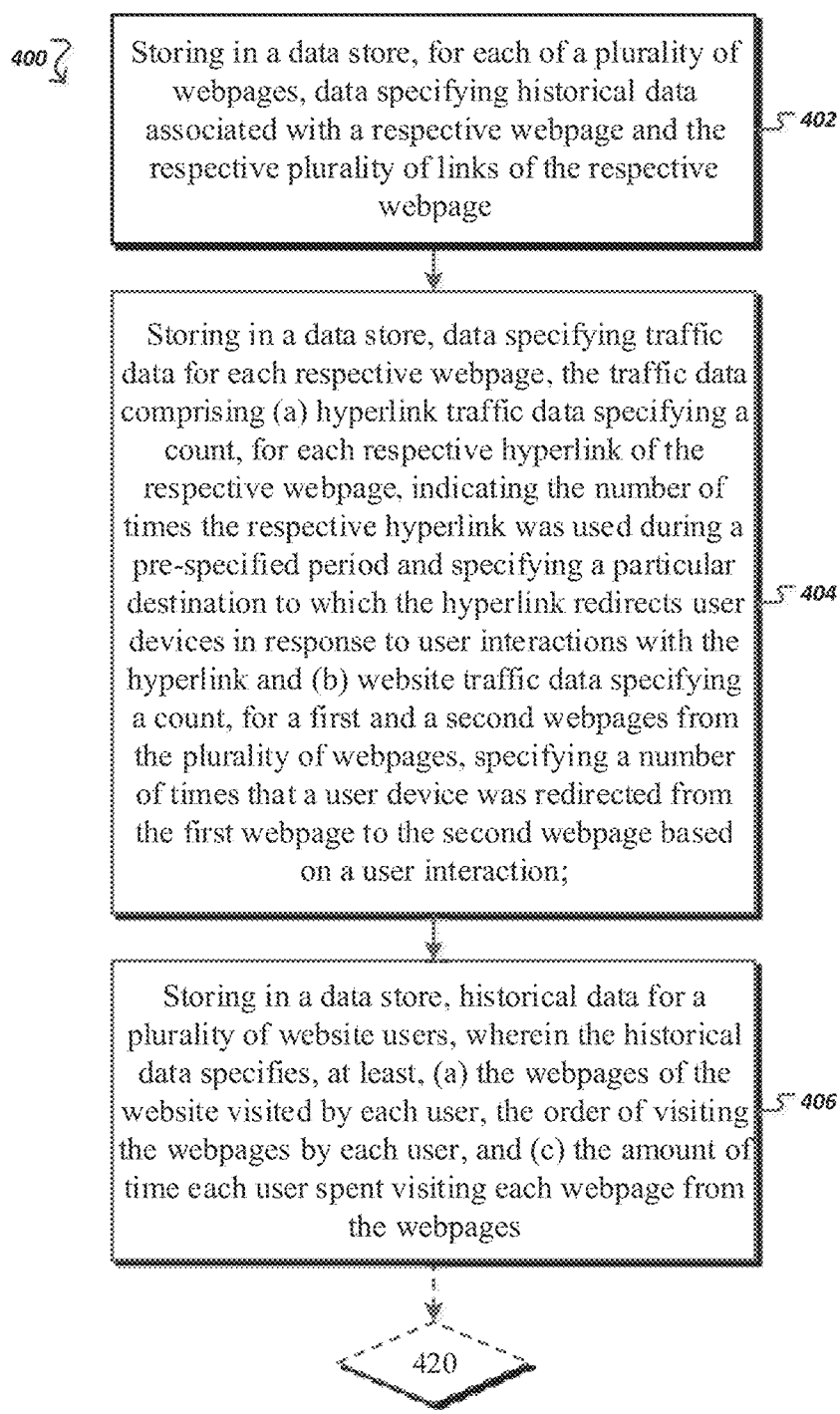
Figure 5A:
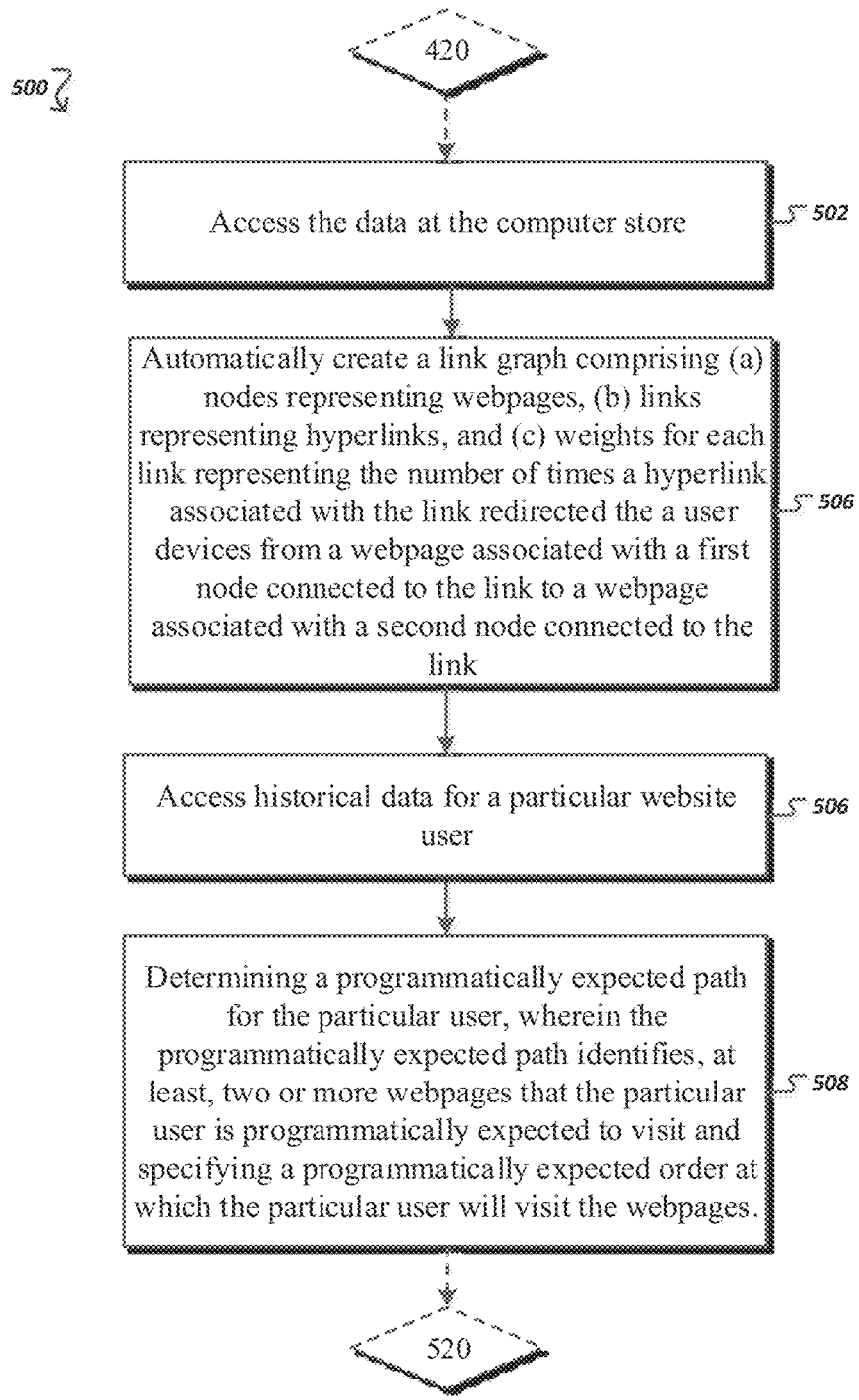
Figures 5B, 5C:
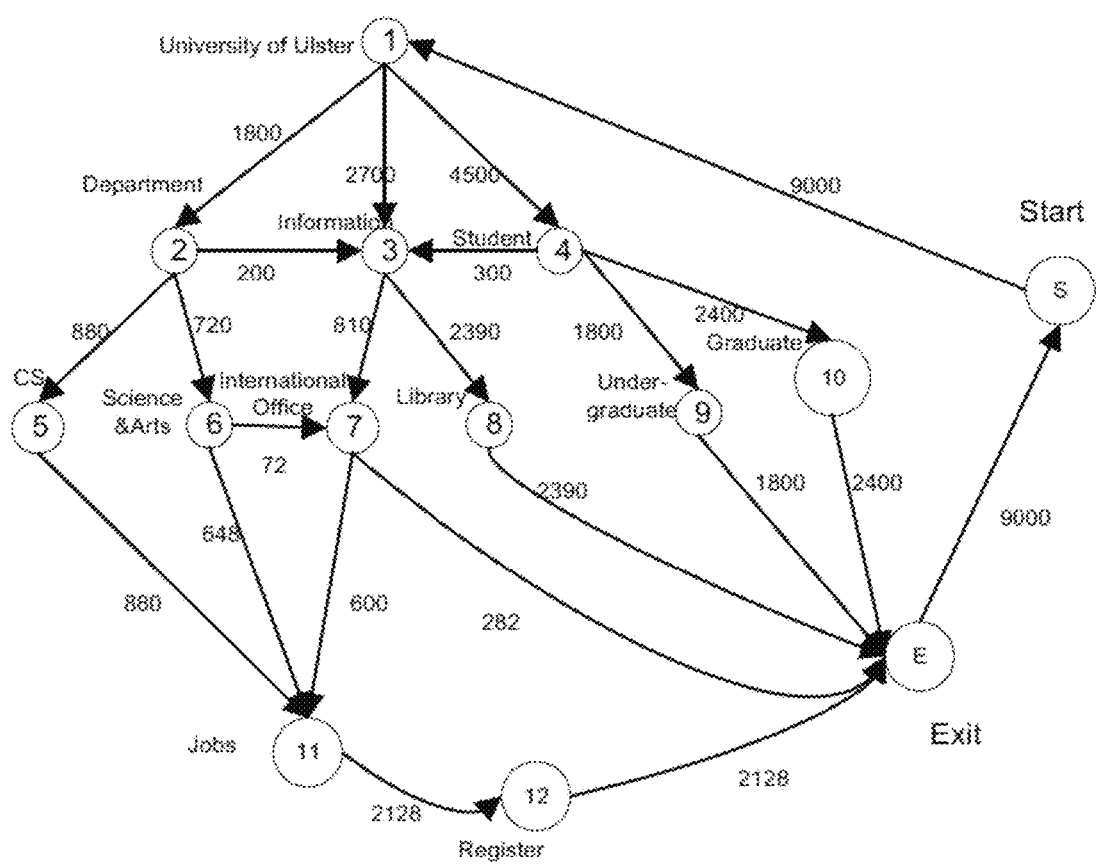
Figure 6A:
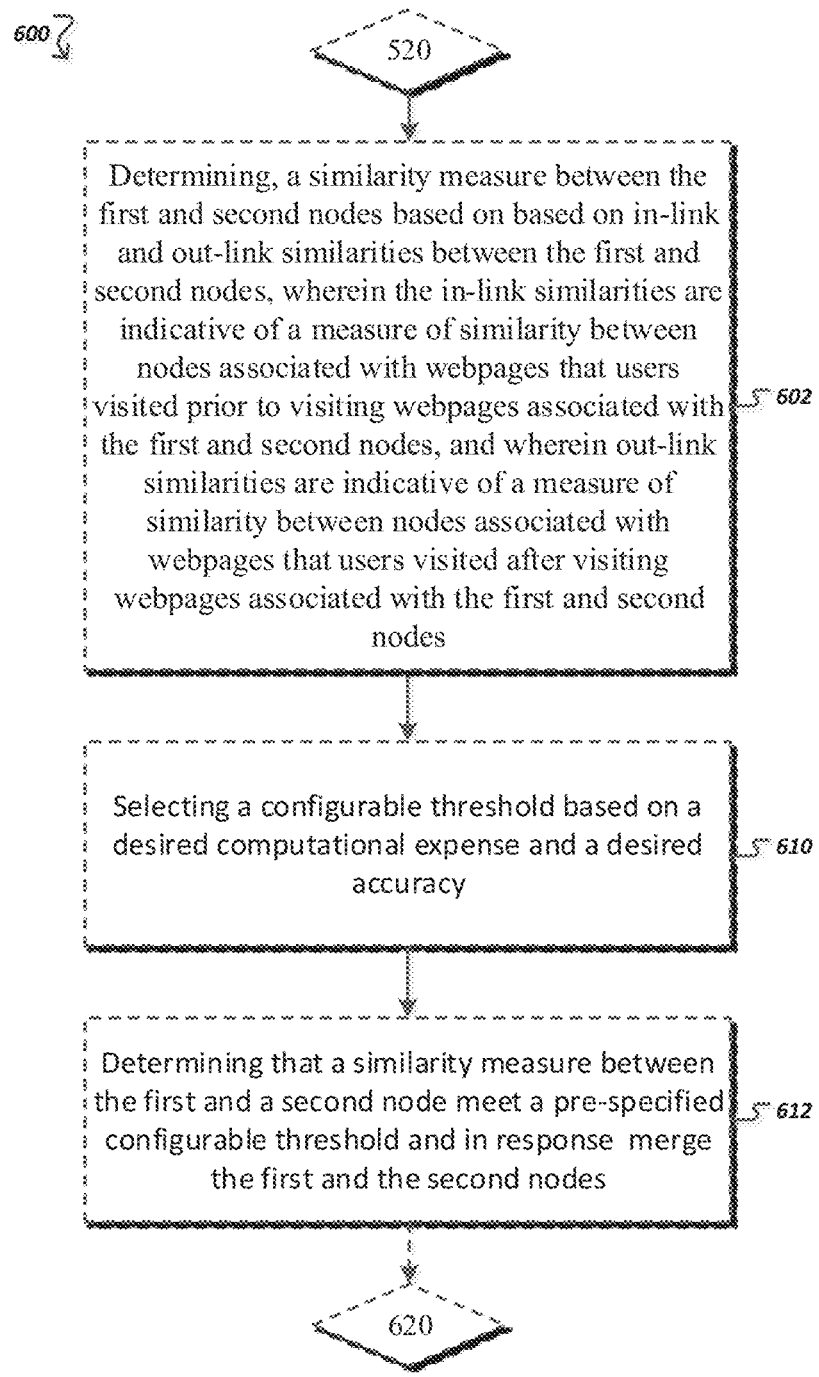
Figure 7:
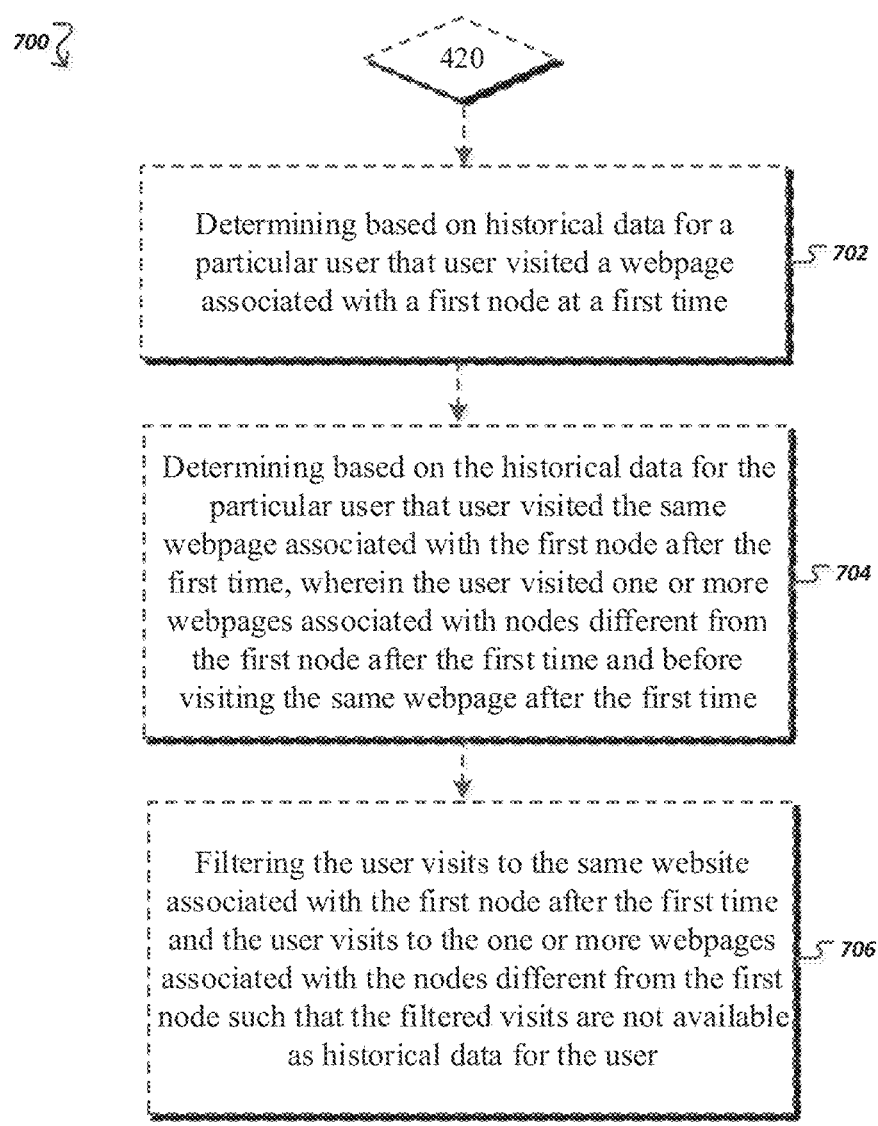
Figure 8:
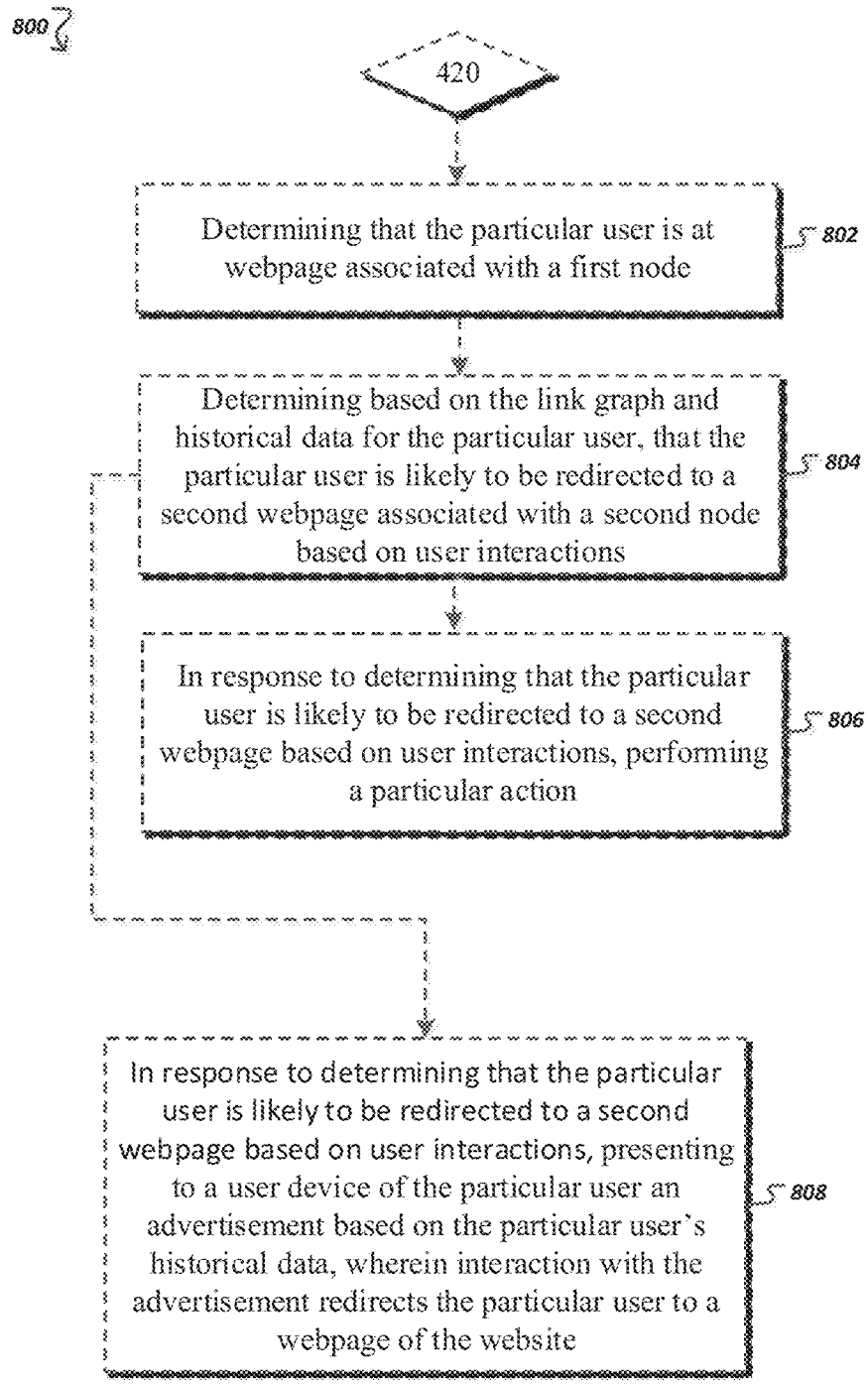
Figure 9A:
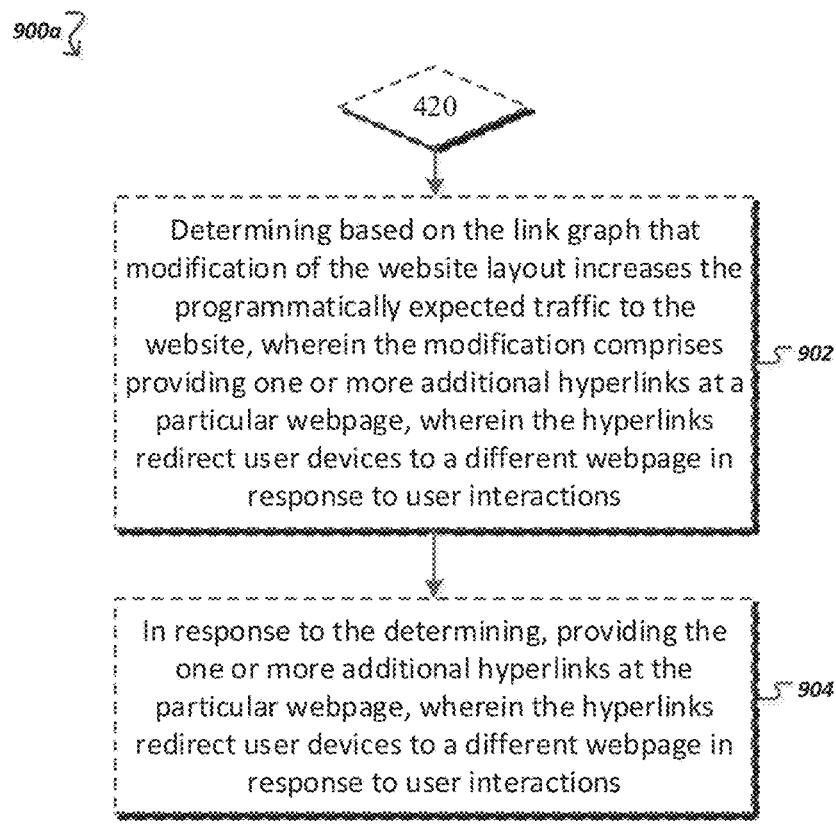
Figure 9B:
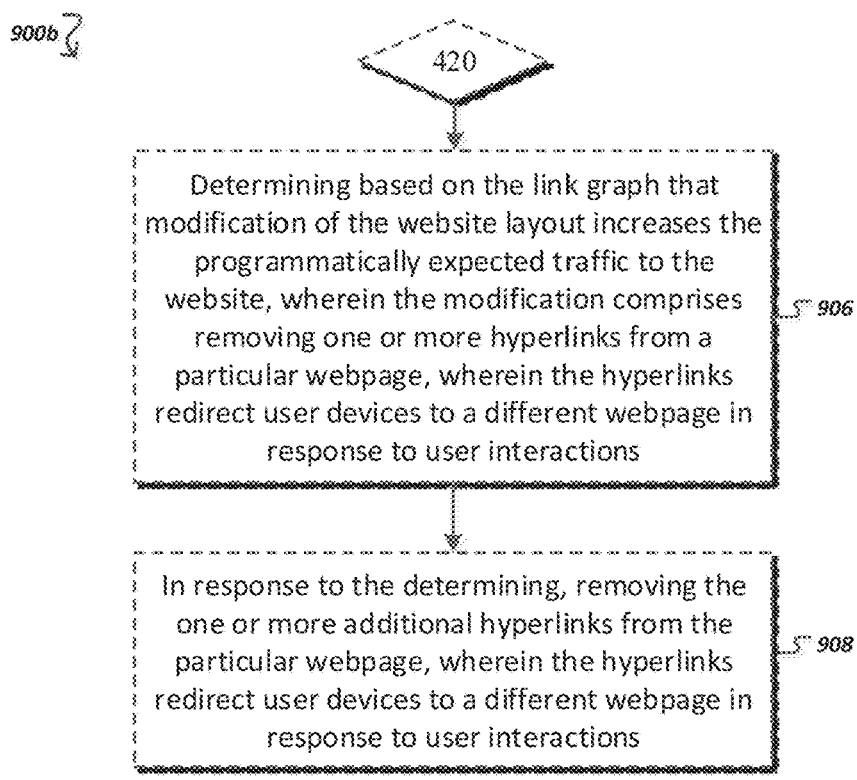
Figure 10A:
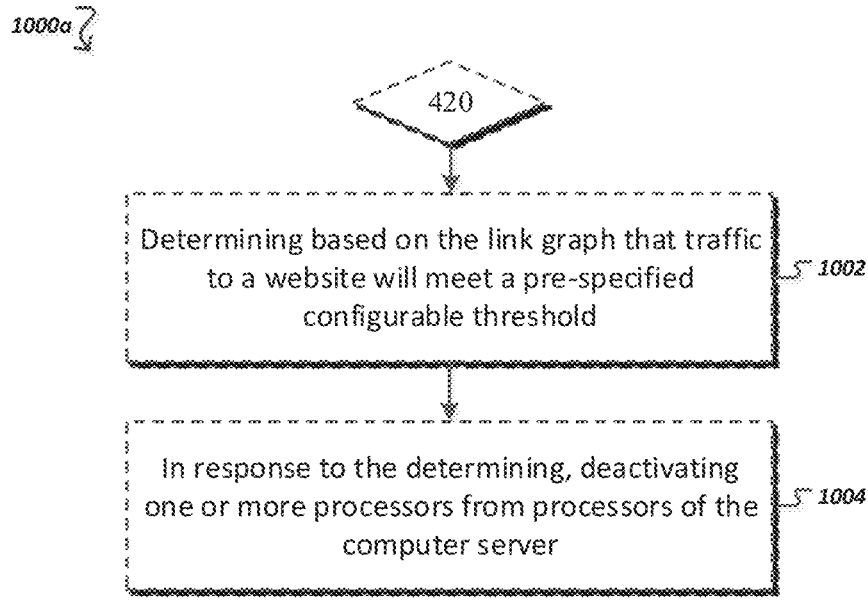
Figure 10B:
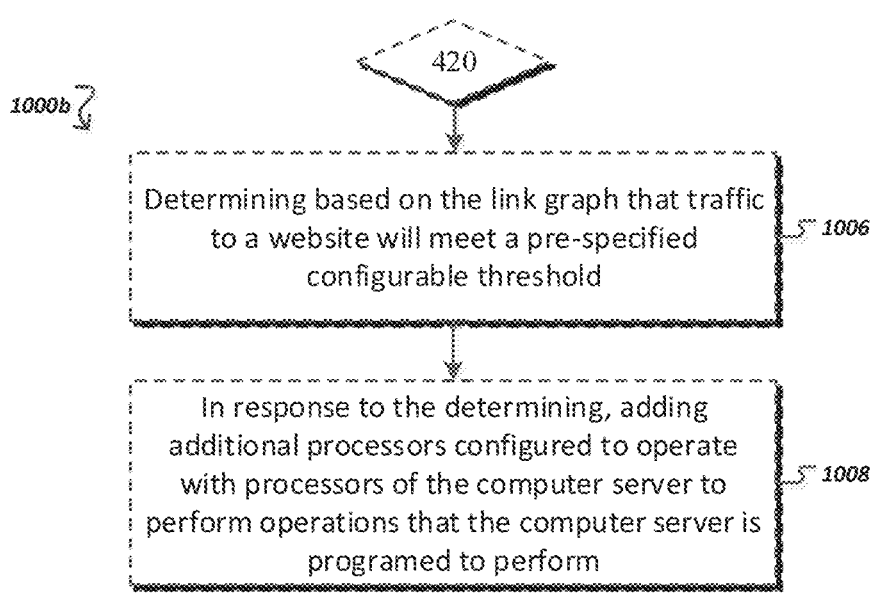
Figure 11:
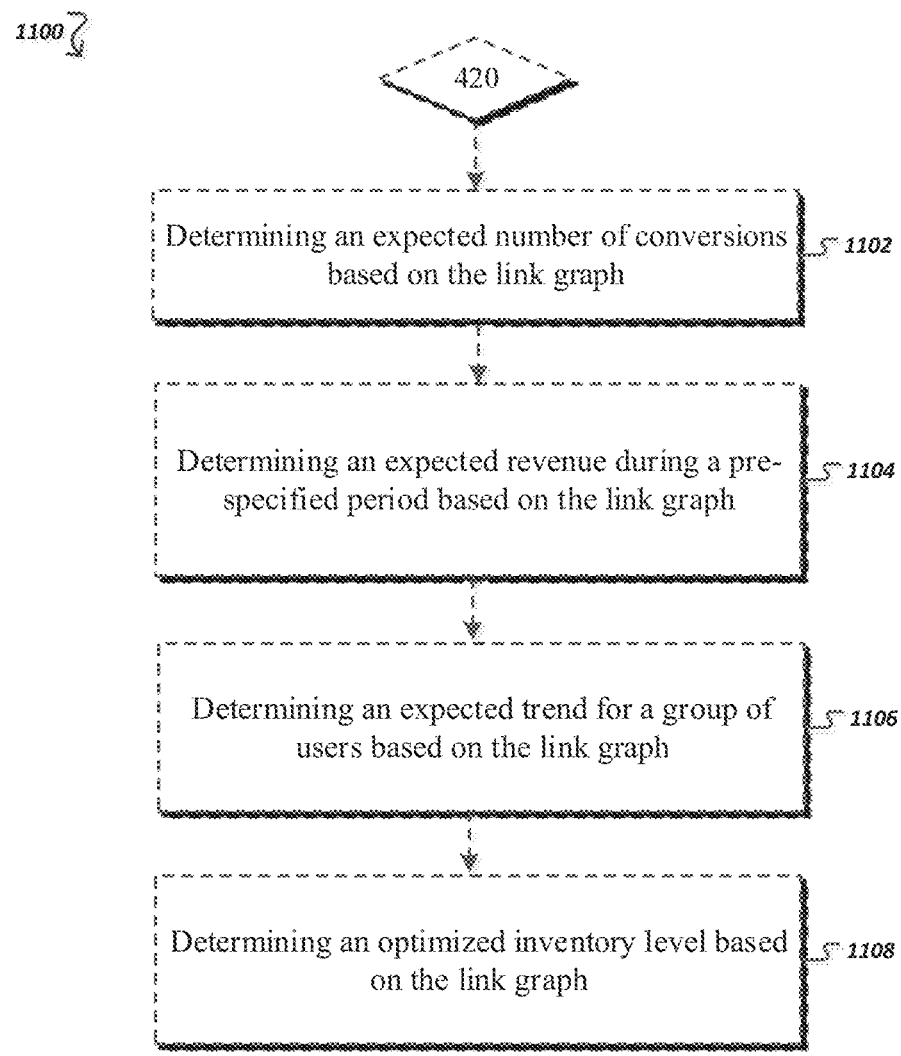

Having thus described the invention in general terms, reference will now be made to the accompanying drawings, which are not necessarily drawn to scale, and wherein:

FIG. 1 is an overview of an example system that can be used to practice embodiments of the present invention;

FIG. 2 is an exemplary schematic diagram of a computing entity according to one embodiment of the present invention;

FIG. 3 is an exemplary data flow illustrating interactions between a server, one or more consumer devices, and one or more merchant devices;

FIG. 4 is a flow chart illustrating various procedures and operations that may be completed in accordance with various embodiments of the present invention;

FIG. 5A is a flow chart illustrating various procedures and operations that may be completed in accordance with various embodiments of the present invention;

FIG. 5B depicts an exemplary data source for constructing an exemplary link graph;

FIG. 5C depicts an example graphical representation of a link graph for a website;

FIG. 6A is a flow chart illustrating various procedures and operations that may be completed in accordance with various embodiments of the present invention;

FIG. 6B shows a plurality of transition matrices for constructing link graphs and operations associated with the matrices;

FIG. 6C shows a plurality of transition matrices for constructing link graphs and operations associated with the matrices;

FIG. 6D shows a plurality of transition matrices for constructing link graphs and operations associated with the matrices;

FIG. 6E shows a plurality of transition matrices for constructing link graphs and operations associated with the matrices;

FIG. 7 is a flow chart illustrating various procedures and operations that may be completed in accordance with various embodiments of the present invention;

FIG. 8 is a flow chart illustrating various procedures and operations that may be completed in accordance with various embodiments of the present invention;

FIG. 9A is a flow chart illustrating various procedures and operations that may be completed in accordance with various embodiments of the present invention;

FIG. 9B is a flow chart illustrating various procedures and operations that may be completed in accordance with various embodiments of the present invention;

FIG. 10A is a flow chart illustrating various procedures and operations that may be completed in accordance with various embodiments of the present invention;

FIG. 10B is a flow chart illustrating various procedures and operations that may be completed in accordance with various embodiments of the present invention;

FIG. 11 is a flow chart illustrating various procedures and operations that may be completed in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to predicting consumer behavior. For example, the methods, apparatus and computer program products described herein are operable to determine one or more likely path that a consumer is likely to take when browsing a website having a plurality of webpages. In one implementation, a link graph for the website may be generated based on traffic data or historical traffic data (used herein interchangeably) for the website. In some implementations, traffic data may include hyperlink traffic data specifying a count, for each hyperlink of each webpage of the website. For example, hyperlink traffic data may indicate that a hyperlink was used during a pre-specified period. Similarly, in some implementations, the hyperlink traffic data may specify a particular destination to which the hyperlink redirects consumer devices responsive to consumer interactions with the hyperlink.

In some implementations, the traffic data may further include website traffic data specifying a count, for webpages of the website, specifying a number of times that a consumer device was redirected from each webpage of the website to each different webpage of the website based on a consumer interactions. In some implementations, the path for a particular consumer may be determined based on historical data for the particular consumer in addition to the traffic data for the website. For example, the historical data for the particular consumer may include data identifying webpages of the website visited by the particular consumer. In some implementations, the historical data may include data identifying the order of visiting the webpages by the particular consumer. Similarly, the historical data may identify the time that the particular consumer spent visiting each webpage of the website.

In one example, a computer server (e.g., computer server of a promotional and marketing service) may access the traffic data to automatically create a link graph including nodes representing webpages, links representing hyperlinks, and weights for each link representing the number of times a hyperlink associated with the link redirected a consumer devices from a webpage associated with a first node connected to the link to a webpage associated with a second node connected to the link. For example, weights for a link between a first and a second webpage for a website may specify the number of times consumers interacted with a hyperlink associated with the link during a pre-specified period. In turn, the computer server may determine a programmatically expected path for a particular consumer visiting the website. In some implementations, the programmatically expected path may identify webpages that the particular consumer is likely to visit and a programmatically expected order at which the particular consumer will visit the webpages. Accordingly, a programmatically expected browsing behavior may be determined for a plurality, a group and/or all of the visitors of the website.

Because analysis shows that traffic data for the website and historical data for the consumers are highly relevant to determining programmatically expected consumers' behaviors, the computer server may access, capture, and/or store such data. The data may then be used to determine expected consumers' behaviors. According to the expected consumers behaviors the promotional and marketing service, for example, may use the determined expected consumers' behaviors to adjust or optimize various business, marketing, and performance aspects. For example, the promotional and marketing service may adjust or change the layout of the website based on the expected consumers' behaviors. In one implementation, the promotional and marketing service may add and/or remove links from webpages in order to drive more traffic to a particular webpage and/or to the website in general. Similarly, the promotional and marketing service may add and/or remove webpages from the website in order to drive more traffic to a particular webpage and/or to the website in general. These adjustments may be optimized to enhance the consumer experience while browsing the website. In some implementations, the expected consumer behaviors may be used to target advertisements to consumers responsive to determining that the consumer is likely to perform a particular action. In one implementation, the promotional and marketing service may provide a particular advertisement to a particular consumer based on the consumer's programmatically expected path and a current webpage that the consumer is visiting and/or one or more webpages that the consumer recently visited. For example, responsive to determining that the consumer is likely to exit the website based on the current webpage the consumer is visiting and the pragmatically expected path for the consumer, the promotional and marketing service may provide an advertisement that the consumer is likely to interact with, to a user device of the consumer. In some implementations, the interaction with the advertisement may redirect the consumer device of the consumer back to a webpage of the website.

In one example, a promotion and marketing system may supply a data set including the traffic data for the website and the historical data for consumers to a learning machine or algorithm. Once the learning machine or algorithm is trained, live data associated with different consumers may be input and the learning machine or algorithm may then predict the behavior of the other consumers. Alternatively, the expected consumer behavior may be directly calculated from the link weights and the historical data for the consumers. As such, the promotion and marketing system may determine how to adjust, for example, advertisement targeting and marketing efforts. Alternatively, or additionally, in some example embodiments, the predictions may be used to determine a number of purchases likely to be made from the website of the promotion and marketing service or seller during a pre-specified period. This enables sellers to adjust, for example, their marketing strategy, number of employees, budgets, number of required processors for maintaining the website and/or the like. Similarly, the above enables the seller to adjust various similar aspects for each consumer independently.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. It should be understood, that the term "traffic data" refers to data specifying the number of visits for website and/or a webpage, the frequency of visits for the same, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer or a promotion, participate in redemption, generate rewards, provide a point of sale device or service, issue payments to providers and/or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like. It should be understood that consumers include potential consumers that may visit or interact with webpages of the promotional service but have not made any purchases yet. It should be understood that the terms "consumer" and "user" are used interchangeably herein.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like, which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems. Throughout this specification, the terms "user device" and "consumer device" may be used interchangeably.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like. In some implementations, discretionary data for a consumer may include historical data specifying, at least, a portion of the browsing history of the consumer.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also grant access to certain features or tools based on whether certain discretionary data has been provided. For example, the consumer may be required to provide information relating to their interests or location during a registration process. In some implementations, the "discretionary data" may include demographic data.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limited to one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in-store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including, but not necessarily limited to, offering parameters, redemption parameters, and promotion content. For example, promotion components may include, but are not limited to, promotion titles, promotion leads (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, webpage, application interface, or the like, electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It should be appreciated that the term "programmatically expected" indicates machine prediction of occurrence of certain events. For example, a "programmatically expected" number of purchases by a first consumer is a number determined by machine prediction specifying the expected number of promotions that will be purchased by the first consumer.

As used herein, the term "likelihood" refers to a measure of probability for occurrence of a particular event. For example, the likelihood that a consumer will purchase a promotion within a pre-specified period may be a value associated with a specific scale. In some implementations, the machine predictions discussed above are based, at least in part, on the "likelihood" that an event will occur. Similarly, in some implementations, machine predictions are based on attributes associated with a consumer and/or an associated merchant promotion.

It should be appreciated that the terms "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

As used herein the term "path" refers to the order of visiting webpages of a website during a browsing session or pre-specified period of time. For example, the "path" may specify that a consumer visited a homepage of the website, followed by a webpage for a promotion, followed by a webpage for purchasing the promotion and providing payment information. It should be appreciated that the term "link graph" refers to a graph having nodes associated with webpages, links between the nodes associated with hyperlinks, and weights for the links associated with the number of times that consumers interacted with a respective hyperlink.

Technical Underpinnings and Implementation of Exemplary Embodiments

Merchants, including manufacturers, wholesalers, and retailers, have spent a tremendous amount of time, money, manpower, and other resources to determine the best way to market their products to consumers and increase their sales and revenues. Whether a given marketing effort is successful is often determined based on the return-on-investment offered to the merchant from increased awareness, sales, and the like, of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, accuracy of data available, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services. For example, providing promotions and advertisements to consumers based on predictions of consumer behavior and at a rate and/or time based on the predictions, ensures that the consumers are responsive to the promotions and enhances the consumer experience. Similarly, advertisement and marketing efforts may target consumers that are likely to be satisfied with and be responsive to advertisements and marketing efforts. For example, the advertisement and marketing efforts may target a particular consumer at a particular time or in response to predicting that the consumer is likely to perform a particular action that is associated with the particular consumer having a high likelihood of accepting a particular promotion. In turn, this reduces resources required to manage and provide promotions. Similarly, this reduces the cost associated with providing promotions, advertisements and cost associated with marketing campaigns. By eliminating the processing required for providing promotions, advertisements, and conducting advertisement campaigns that are unlikely to be successful, the stress on processor 202 is substantially reduced. For example, since the numbers of operations performed by processor 202 are significantly reduced, the power consumption, and the processing power and speed requirements for processer 202 are also reduced. In turn the maintained and operational costs of circuitry 200 are also reduced. The predictions may be further utilized to optimize a computer server comprising processer 202. For example, responsive to predicting that traffic is likely to increase at a website of the promotional and marketing service, the computer server may allocate or add additional processors to perform the operations of processor 202. Similarly, the computer server may de-allocate or remove/deactivate processors of the computer server based on a prediction specifying that traffic is likely to decrease.

The inventors have identified that being able to more accurately predict consumer behavior, can greatly enhance the performance of promotional and marketing services. Accordingly, being able to accurately predict consumers' behavior can be very useful in selecting promotions to offer, consumers to offer the promotions to, and a time to offer the promotion to each respective consumer. Similarly, accurate predictions of consumer behavior can be used to determine how to most effectively provide advertisements to consumers. For example, the predictions may be used to determine the most effective medium of advertising for a particular consumer, the most effective frequency of providing advertisements to consumers, and/or other optimizations for marketing campaigns. The predictions may be used to determine financial projections associated with the promotional and marketing service. Similarly, the predictions may be used to optimize financial aspects associated with the promotional and marketing service. For example, the predictions can aid in determining the most effective size of inventory, the most effective number of employees at different departments, and/or the like.

Being able to selectively offer a promotion and advertisements to consumers based on accurate consumer behavior predictions, allows for offering of higher quality promotions that are likely to satisfy consumers and result in conversions. Additionally, being able to accurately predict consumers behaviors facilitate optimization of server(s) of the promotional and marketing service, as described above. This, in turn, is reflected on the resources required to operate and maintain the promotional service. For example, providing promotions that are likely to satisfy consumers, increases the processing efficiency of exemplary circuitry 200 and reduces the stress on exemplary circuitry 200. In some implementations, this can result in faster processing and response times, which in turn improve the consumer experience. Also, the processing power required to maintain websites of the promotional and marketing service are minimized. Additionally, the consumer experience is also enhanced because the consumer is less likely to receive promotions that are not relevant to their interests.

The inventors have therefore determined that existing electronic systems for predicting consumer behavior fails to accurately and efficiently address these issues. As a result of these problems and others that may arise from time to time, delays and inefficiencies may be introduced into the prediction process, which in turn may be reflected on user satisfaction and overall revenue generated. The inventors identified methods and systems for predicting programmatically expected consumer behaviour at a website (e.g., website for the promotional and marketing service within a pre-specified window). In some implementation, a link graph may be created for the website. The link graph aids in the prediction of consumers behaviours at the website. In turn, such predictions may be used to predict additional attributes, such as, expected number of purchases during a pre-specified period, the expected traffic at a website, the required processing power for maintaining the website, the expected revenue from purchases during a pre-specified period, and/or the like. As result, the predictions and above may be utilized to significantly improve the user experience, allow for optimization of various performance aspects associated with the promotional and advertisement service, and increase the overall revenue associated with offering promotions. For example, the predictions may be used to alter the layout of the promotional and advertisement service website to drive more traffic to the website or to increase the number of conversions at the website.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a webpage via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant.

In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, prediction circuitry 210, link graph management circuitry 212, and consumer data management circuitry 214. The apparatus 200 may be configured to execute the operations described above with respect to FIG. 1 and below with respect to FIGS. 3-11. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Prediction circuitry 210 includes hardware configured to predict and/or determine programmatically expected consumer behavior for consumers visiting a particular website. The prediction circuitry 210 may utilize processing circuitry, such as the processor 202, to perform these actions. The prediction circuitry 210 may send and/or receive data from link graph management circuitry 212 and/or consumer data management circuitry 214. In some implementations, the sent and/or received data may be data defining a link graph for the website and associated link weights. In some implementations, the sent and/or received data may be filtered data for a consumer that specifies a path or a filtered path for the consumer during a website visit. For example, a path for a consumer be determined based on historical data by consumer data management circuitry 214. The consumer data management circuitry 214 may filter the path to remove one or more webpages that the consumer visited from the path. The link graph management circuitry 212 may automatically create a link graph for the website. In turn the prediction circuitry 210 may receive the filtered path data for the consumer and the link graph data from consumer data management circuitry 214, and link graph management circuitry 212 respectively. In turn, the prediction circuitry 210 may determine a programmatically expected consumer behavior of the consumer based on the received data. The prediction circuitry 210 may further predict other attributes associated with the website. For example, the prediction circuitry 210 may further determine a programmatically expected number of conversions and/or sales through the website. Similarly, the prediction circuitry 210 may determine an overall expected level of traffic for the website during a pre-specified period. In turn, the prediction circuitry 210 may perform particular actions in response to the predictions. For example, the prediction circuitry 210 may activate or deactivate one or more secondary servers 308a and 308b based on predictions. Similarly, the prediction circuitry may provide data to processor 202 that causes the processor 202 to activate or deactivate one or more secondary servers 308a and 308b. It should also be appreciated that, in some embodiments, the prediction circuitry 210 may include a separate processor, specially configured field programmable gate array (FPGA), or application specific interface circuit (ASIC) to prediction, update predictions and/or manage predictions of consumers behavior, and train and use a machine learning model for predicting consumer behavior. In some implementations, link graph management circuitry 212 and number of consumer data management circuitry 214, described below, may be sub-circuitry belonging to prediction circuitry 210. The prediction management circuitry 210 may be implemented using hardware components of the apparatus configured by either hardware or software for implementing these planned functions.

Link graph management circuitry 212 includes hardware configured to automatically create and manage a link graph for one or more website having a plurality of webpages. As described above data representing the link graph and associated weights may be provided to prediction circuitry 210, in order for prediction circuitry 210 to predict consumer behaviors based on the link graph and associated weights. In one implementation, data representing a visual link graph is provided. In other implementation, data representing the weights and connections between nodes of the graph is provided in a matrix format. The link graph management circuitry 212 may utilize processing circuitry, such as the processor 202, to perform these actions. However, it should also be appreciated that, in some embodiments, the link graph management circuitry 212 may include a separate processor, specially configured field programmable gate array (FPGA), or application specific interface circuit (ASIC) for creating, maintaining, and updating link graphs and data associated with link graphs. Similarly, consumer data management circuitry 214 includes hardware configured to identify, filter, and manage consumer data. Again, it should also be appreciated that, in some embodiments, the consumer data circuitry 214 may include a separate processor, specially configured field programmable gate array (FPGA), or application specific interface circuit (ASIC) for identifying, managing, formatting and filtering consumer data and data associated with consumers and websites. Circuitry 212 and 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, historical data, review data and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximizing the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated, however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

In some embodiments, secondary servers 308a and 308b may be in bidirectional communication with server 302. The secondary server may be activated and deactivated according to a predicted computational expense and/or load. Accordingly, secondary servers may be activated only responsive to prediction that the computational expense and or load will increase past a threshold specifying the maximum load and/or expense that server 302 is capable of handling. Similarly, the secondary servers may be deactivated responsive to determining that server 302 is capable of handling a predicted computational load and/or expense.

Embodiments advantageously provide for improvements to the server by allowing prediction of consumer behavior more efficiently and accurately. In turn, this reduces the server stress. For example, by eliminating provisioning of promotions that are unlikely to be accepted by consumers, the server reduces the processing associated with offering promotions without reducing the overall number of promotions accepted by consumers. In turn, the processing power requirement of the server is reduced and the overall revenue is increased. Similarly, the operations described above with respect to activating and deactivation secondary processors 308a and 308b significantly reduces the processing power requirement of the servers and increases the overall revenue.

Example Processes for Predicting Consumer Behavior

As described, a promotional and marketing service may utilize the internet to provide consumers with available promotions related to products, services or experiences offered by providers that may be of interest to the consumers. However, optimizing various business, advertisement targeting, and processing aspects may prove challenging. A promotion and marketing service may spend limited resources performing various business, advertisement targeting, and processing operations. Such operations may yield non-optimized results that negatively affect efficiency and overall revenue. For example, the limited resources may be spent targeting consumers at a time when they are less likely to be responsive to advertisements.

Naturally, the ability to accurately predict consumer behavior can significantly improve revenue and consumer satisfaction. As described, both consumers and promotional and marketing services can benefit greatly from such accurate predictions. Additionally, predicting consumer behavior can enable to the promotional and marketing service to optimize and adjust various financial, business, and marketing aspects based on the predictions. Accordingly, there exists a dire market need for methods and systems that can accurately predict consumer behavior accordingly.

FIG. 4 is a flow chart of an example process 400 for predicting consumer behavior. The process 400 begins storing in a data store, for each of a plurality of webpages, data specifying historical data associated with a respective webpage and the respective plurality of links of the respective webpage (402). For example, the process 400 may store data associated with a website of a promotional and marketing service. In one implementation, the data may be traffic data associated with webpages of the website and/or links on the webpages.

In one implementation, the promotional and marketing service may be a service for providing promotions for a second entity (e.g., third party). For example, the second entity may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as, a bike. Similarly, the second entity may be a service store, such as a hair salon or a car repair shop. In such implementations, the service store may request transmittal of promotion for services provided by the store (e.g., haircut, hair coloring, oil change). In some implementations, stores may offer a combination of services and goods. In some implementations, such offers may be provided to consumer devices of consumers while consumers are browsing the website.

The process 400 may continue with storing in a data store, data specifying traffic data for each respective webpage, the traffic data comprising (a) hyperlink traffic data specifying a count, for each respective hyperlink of the respective webpage, indicating the number of times the respective hyperlink was used during a pre-specified period and specifying a particular destination to which the hyperlink redirects user devices in response to user interactions with the hyperlink and (b) website traffic data specifying a count, for a first and a second webpages from the plurality of webpages, specifying a number of times that a user device was redirected from the first webpage to the second webpage based on a user interaction (404). In one implementation, the process 400 may store traffic data that includes hyperlink traffic data and website traffic data. In some implementations, hyperlink traffic data may be traffic data specifying a count for each hyperlink. The count may indicate, for example, a number of times each hyperlink was used during a pre-specified period. For example, the count may indicate that 180 users and/or consumers interacted with a particular hyperlink on a particular webpages during a previous month. The data may also identify a landing page for the hyperlink. A landing page for the hyperlink may be webpage that consumer devices are redirected to in response to consumer interaction with the hyperlink.

In some implementations, the traffic data may further include website traffic data. In one implementation, website traffic data may specify for a plurality of pairs of webpages, a number times consumers were redirected from a first webpage from the pair to a second webpage from the pair, in response to consumer interaction with a hyperlink. In some implementations, the hyperlink may be embedded in an advertisement. In other implementations, the hyperlink may be provided as a radio button for guiding consumers to different webpages of a website.

The process 400 may continue with storing in a data store, historical data for a plurality of website users, wherein the historical data specifies, at least, (a) the webpages of the website visited by each user, the order of visiting the webpages by each user, and (c) the amount of time each user spent visiting each webpage from the webpages (406). For example, the process 400 may store historical data in association with consumers and/or consumers' accounts. In one implementation, the historical data may identify webpages of the website that each consumer visited and the order at which each consumer visited the webpages of the website. In one implementation, the historical data for consumers may be determined from browsing history of consumers. In some implementations, the historical data for consumers, is determined from discretionary data of the consumer. In some implementations, the historical data for consumers, is determined from click stream data. In some implementations, the historical data may identify various metrics and features associated with visiting each webpage. For example, the historical data may identify the time each consumer spent browsing or visiting each webpage. Similarly, the historical data may identify consumers' interests, locations while visiting the website, mouse over data (e.g., the user hovering over a webpage portion for a certain amount of time) and/or the like.

In some implementations, the historical data may be data indicating the number of promotions previously accepted by the consumer. The data may indicate the time and a device used to accept these promotions. Similarly, the data may include a measure of frequency indicating how often promotions are accepted by the consumer. In some implementations, the data may include location data indicating, for example, locations at which the consumer accepted promotions. In some implementations, the data may include data specifying types of promotions, goods, and/or services that are of interest to the consumer. For example, the data may include discretionary data for the consumer as described above. In turn the historical data and the traffic data discussed above may be used to create a link graph for the website and make various predictions based on the created link graph, as described below with reference to optional process 500 of FIG. 5A.

The process 400 may continue with the optional steps of process 500. The process 400 may continue with accessing the data at the computer store (502). For example, the process 500 may access the stored traffic data for webpages of the website and the historical data for the plurality of website users. In one implementation, the data at the computer store may be a web log file. For example, the data may be an ECLF log file comprising URIs of both requested documents and refers indicating where the requests originated from. As shown in FIG. 5B an ECLF log file contains rich records of consumers' requests for documents on a website. Additionally, the log file may identify other information associated with a consumer device. For example, the log file may identify an operation system of the consumer device and/or a web browser used to view the website. In some implementations, the log file is filtered and process prior to being stored in a computer store. For example, data required for automatically creating the link graph may be extracted from the log file and processed. In some implementations, the extracted data may be stored in a data store in a format different from the format of the log file. In some implementations, the data is filtered to remove unwanted data elements from the log file prior to storage. For example, data representing the operating system of the consumer device may not be needed for creating the link graph. Accordingly, the operating system data may be filtered from the log file.

The process 400 may then automatically create a link graph comprising (a) nodes representing webpages, (b) links representing hyperlinks, and (c) weights for each link representing the number of times a hyperlink associated with the link redirected the a user devices from a webpage associated with a first node connected to the link to a webpage associated with a second node connected to the link (504). For example, the process 500 may continue with automatically creating a link graph as shown in FIG. 5C. Nodes "S," "E," and "1"-"12" each represent a webpage of the University of Ulster website. The directional arrows between nodes represents links that redirect consumer devices from a webpage associated with a first node to a webpage associated with a second node. The direction of each arrow specifies which webpage contains the hyperlink and to which webpage is a consumer device redirected in response to consumer interaction with the hyperlink. Weights shown proximate each arrow (link) specify a measure of frequency that a hyperlink is used during a pre-specified period. For example, the weights may be directly proportional to a number of times that a hyperlink was used during a pre-specified period. In one implementation, the weights may be the number of times that consumers interacted with the hyperlink during a pre-specified period (1 hour, 10 hours, 1 day, 1 month, 12 month). In one implementation, the weights may be a normalized count of the number of times a hyperlink was interacted with during a pre-specified period. It should be understood that the website may be a website offering various services and features. In one implementation, the website is a website for a promotional and marketing service.

The nodes "S" and "E" represent a starting point and an exit point for consumer visits to the website. In some implementations, a directed path between the exit node and the starting node is added to ensure that there is path between any two nodes in the link graph. In one implementation, extra incoming weights may be assigned to links connected to the start and/or exit nodes. In one implementation, extra outgoing weights to incoming links may be distributed. These and other operations may optionally be performed to ensure that the amount of weights on all incoming links of a webpage matches the amount of weights on all outgoing links. For example, the above operations may be performed to remedy weights for incoming links of a webpage not matching the weights for outgoing links due to caching. In some implementations, links between nodes are only shown when the weights for the links exceed a pre-specified configurable threshold (e.g., 10, 100, 200, 800). In other implementations, links are shown between each and every pair of nodes of the link graph.

In turn, the process 500 may continue with accessing historical data for a particular website user (506). For example, the process 500 may access historical data associated with a particular consumer or a consumer account associated with the website. In some implementations, accessed historical data may be filtered data as described above. Finally, the process 500 may end with determining a programmatically expected path for the particular user, wherein the programmatically expected path identifies, at least, two or more webpages that the particular user is programmatically expected to visit and specifying a programmatically expected order at which the particular user will visit the webpages (508). For example, based on historical data for a consumer and based on the link-graph, the process 500 (e.g., prediction circuitry 210) may determine an expected path for a visit to the website by the consumer. For example, the expected path may indicate that the consumer is likely to start at node "S" then move to node "1," followed by nodes "4," "10" and "E" respectively. In one implementation, the prediction circuitry 210 may identify a current node having a webpage that the consumer is currently visiting. The prediction circuitry 210 may then determine where the consumer is most likely to go next. For example, responsive to determining that a consumer is at webpage associated with node 3, the prediction circuitry 210 may predict that the consumer is more likely to go to a webpage associated with node "8" next. Once predictions are made for a plurality of consumers, the predictions may be aggregated to determine predictions for the website. For example, the predictions system may determine an expected number of conversions or sales associated with the website. In one implementation, the layout of the website may be adjusted to increase the likelihood that consumers are going to end at a particular webpage. For example, the website may altered to increase traffic to a cart or a purchase webpage. In some implementations, weights associated with links, the link graph, attributes associated with consumers and historical data of consumers may be used to train a machine learned prediction model. In one implementation, the machine learned prediction model may determine various predictions associated with the website and/or the promotional and marketing service.

It should be understood that the selection of attributes for training machine learning models or for consumer behavior prediction processes can greatly affect the respective performance. In some implementations, attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

Other exemplary attributes for training the machine learned model may include attributes corresponding to user satisfaction. In one implementation, such attributes may include an attribute specifying a number of calls made to customer service by the respective consumer during a pre-specified period. For example, the attribute may specify a number of customer service calls initiated by the consumer during the last year. Similarly, an overall wait time during customer service calls may be one attribute. In some implementations, the attributes may include attributes associated with positive and negative responses to surveys. For example, one attribute may specify a number of negative responses to surveys by the consumer. Similarly, one attribute may specify a number of positive responses to surveys by the consumer. Some attributes may be associated with data from review websites such as Yelp®, Google®, Yahoo®, City Search®, Trip Advisor®. It should be understood that any review website could have associated attribute data, such as for example Zagat®, Bing® or the like. It should also be understood that attribute data may be associated with reviews from a particular consumer. Attribute data may be generated related to positive and negative reviews provided by respective consumers.

It should also be understood that consumers may have associated data indicating one or more categories, sub-categories, location, hyper-locations, prices or the like. For example, a consumer, may be identified as a consumer that is interested in categories such as "beauty, wellness, and healthcare," "Food and drink," "Leisure Offers and Activities." Similarly, a consumer may be identified as a consumer interested in promotions within a pre-specified price range. For example, a consumer may be identified as a consumer that is likely interested in promotions costing less than $20. Attributes corresponding to such data may also be used for predicting consumer behavior.

In some implementations, the consumer behavior prediction process is performed according to a random forest model. The model may operate by constructing multiple decision trees at training. Each decision tree may be based on different attributes. In some implementations, the random forest model output is the mode of classes or the most occurring class among all the trees of the random forest. In some implementations, the random forest model is trained with historical data associated with various attributes. In some implementations, different trained models may be utilized for different cohorts and/or stages.

These predictions may be used to target advertisements to consumers at times when consumers are most likely to interact with the advertisement. In some implementations, the predictions may be used to alter the layout of the website in order to generally increase conversions and purchases made by consumers. In some implementations, these predictions may be used to optimize various business and performance aspects. For example, servers 308*a* and 308*b* may be selectively activated/deactivated based on predicted traffic for the website. For example, responsive to determining that traffic is likely to increase during a pre-specified period, secondary server 308*a* may be activated. Similarly, responsive to determining that traffic is likely to decrease during a pre-specified period, secondary server 308*a* may be deactivated. It should be understood, that the predictions above may be performed independent of a machine learned model and directly based on the link graph and the stored data described above.

Example Processes for Creating and Compressing a Probability Transition Matrix

In some implementations, each node the link graph shown in FIG. 5C may be considered a state in a finite discrete Markov model. A probability transition matrix containing one-step transition probabilities between nodes of link graph may be determined based on the graph. A one-order Markov chain may be a chain where the conditional probability of visiting a webpage in a next step, is only dependent on the last webpage visited and/or the current webpage visited by a consumer. For example, the transition probability between two webpages of the website may be a probability specifying the likelihood that a consumer will be redirected from first webpage from the pair to a second webpage from the pair in one step. One-step transition probabilities between webpages of the website may be calculated based on the link graph. In some implementations, the link graph may be utilized to create a one-step probability transition matrix.

In some implementations, the probability transition matrix only shows transition probabilities between nodes that have a transition probability exceeding a pre-specified configurable threshold. The transition probability from a first to a second node may be calculated based on the ratio of weights for a transition from the first to the second node against the sum of all weights for transitions from the first node to any other node of the link graph. For example, to determine the probability of transition from node "1" to node "3," a ratio of the weight for the link between nodes "1" and "3" (2700) to the weights for all transitions from the "1" node (1800+2700+4500) is determined. Accordingly, the transition probability from the "1" node to the "3" node is 0.3 (2700/9000). Similarly, other one-step transition probabilities for other nodes may be determined. A transition probability matrix may be constructed using the determined one-step transition probabilities. For example, the one step transition probability matrix of FIG. 6B may be determined based on the link graph of FIG. 5C, as described above. As shown in FIG. 6, the probability transition matrix depicts the probability of transitioning between nodes of the link graph of FIG. 5C.

In some implementations, the process 500 may continue with the optional steps of process 600. The process 600 begins with determining, a similarity measure between the first and second nodes based on based on in-link and out-link similarities between the first and second nodes, wherein the in-link similarities are indicative of a measure of similarity between nodes associated with webpages that users visited prior to visiting webpages associated with the first and second nodes, and wherein out-link similarities are indicative of a measure of similarity between nodes associated with webpages that users visited after visiting webpages associated with the first and second nodes (602). In some implementations, processor 200 and/or link graph management circuitry 212 may compress the probability transition matrix of FIG. 6B. In order to facilitate the compression, in some implementations a similarity matrix, as shown in FIG. 6C, may be created. A similarity matrix may include a measure of similarity between nodes of a link graph. For example, a similarity matrix may include a measure of similarity between each and every node of the link graph of FIG. 5C. The measure of similarity between nodes may be determined based on in-link and out-link similarities between nodes. In one implementation, the in-link similarity between a first node and a second node may be the weighted sum of distance between a first and a second columns associated with the first and second nodes respectively, at each row of the transition matrix of FIG. 6B. Similarly, in one implementation, the out-link similarity between a first node and a second node may be the weighted sum of distance between a first row and a second row associated with first and second nodes respectively, at each column. For example, the out-link probability may be the sum of the out-link probability difference between a first node and a second node. Similarly, the in-link probability may be the sum of the in-link probability difference between a first node and a second node. A measure of similarity between each and every node of the link graph of FIG. 5C is shown the transition similarity matrix of FIG. 6C.

The process 600 may continue with selecting a configurable threshold based on a desired computational expense and a desired accuracy (610). A configurable threshold of similarity may be selected for merging and/or compressing nodes. The configurable threshold may be selected based on a desired computational expense and desired accuracy. For example, raising the configurable threshold results in more nodes being compressed. However, raising the configurable threshold also increases the error. Webpages sharing more in-links, out-links, and having equivalent weights on their respective in-links and out-links are more likely to meet the configurable threshold. Naturally, because of the tradeoff discussed above the selected configurable threshold can greatly affect prediction results. In one implementation, the configurable threshold may be selected based on a machine learned model. In other implementations, the configurable threshold may be selected based on experimental results. For example, the inventors have determined, for the example above, that a configurable threshold between 0.08 and 0.15 yields the best results. In one example, a configurable threshold is 0.1. Accordingly, nodes having a similarity measure that is below or equal to 0.1 may be merged.

The process 600 ends with determining that a similarity measure between the first and a second node meet a pre-specified configurable threshold and in response merge the first and the second nodes (612). As described above, nodes that meet the configurable thresholds may be merged. For example, with reference to FIG. 6C, nodes "2" and "4" meet the configurable threshold since the similarity measure between the two nodes is 0.00. Accordingly, the nodes "2" and "4" are merged in this example. FIG. 6D shows other nodes that meet the configurable threshold. Note that more than a pair of nodes may be merged. For example, nodes "8," "9," "10," and "12" may all be merged because all nodes meet the configurable threshold collectively (8 meets the configurable threshold with 9, 10, and 12, 9 meets the configurable threshold with 8, 10, and 12, etc. . . . ). Once all eligible nodes are combined, a compressed transition matrix may be created as shown in FIG. 6E. Similarly, a new compressed link graph may be created (not shown). The compressed link graph may include information similar to the information of the compressed transition matrix. In some implementations, the compressed link graph includes information identical to the compressed transition matrix. The compressed transition matrix results in much faster computations that are less taxing without sacrificing the accuracy of predictions.

In one implementations, a user history vector is determined based on history data for a consumer. The history vector may be determined based on historical data and/or discretionary data for the consumer. The consumer history vector may detail a path of the consumer since they started browsing the website. The path is compared to the link graph or the compressed transition matrix predictions for the consumer. In one implementation, the path of the consumer being highly similar to the link graph or transition matrix predicted path, may cause the prediction circuitry 110 to weigh the prediction at a higher weight. For example, if a prediction based on the link graph and/or the transition matrix indicated that a particular consumer is likely to visit webpage A, followed by webpage B, followed by webpage C and the history vector for the consumer indicated that the consumer visited webpage A followed by webpage B, were the consumer is currently browsing, then the likelihood or probability that the consumer is going to visit webpage C may be boosted or weighted more heavily.

Predictions may specify a likelihood or a probability that the consumer will visit a particular webpage within the next configurable number (e.g., 2, 5, 8, 34) of transitions. In one implementation, the prediction is determined based on calculating the weighted sum of probabilities that the consumer will arrive at the webpage associated with a node in the compressed transition matrix. As described above the webpage may be webpage for purchasing an item and/or promotion. Accordingly, the prediction circuitry may further predict a likelihood or a probability that the consumer will make a purchase during a pre-specified period and/or a current session. In some implementations, the probability of a consumer reaching a particular webpage at a current session may be presented only if the probability exceeds a particular threshold. In some implementations, the prediction system may specify whether a consumer is likely to reach the particular webpage during a current session. Again, the consumer reaching the particular webpage is deemed likely only if the probability of the consumer reaching that webpage exceeds a configurable threshold. Similar determinations may be made in a similar fashion. For example, the prediction circuitry 110 may determine whether a consumer is likely to make a purchase similarly. In some implementations, the predictions, link graph, and/or compressed or non-compressed transition matrices may be provided to a user device for display. For example, the information above may be provided to user devices of personnel of the marketing and promotional service for display.

Example Processes for Filtering Consumer Historical Data

Historical data for consumers may be filtered to remove data that is not highly relevant to the prediction process. In one implementation a maximum forward path for a consumer may be determined. In some implementations, the maximum forward path removes webpages or nodes associated with webpages that a device of the consumer was redirected to in response to interaction with, for example, a browser back radio button. For example, a consumer may move back to a previously visited webpage to facilitate easier travel or routing. Accordingly, pages visited prior to backtracking may not be highly relevant to the prediction processes described herein. For example, since in some embodiments backtracking indicates that the consumer visited a webpage that he/she did not find interesting, the webpage visit may not be very indicative of the consumer interests. The process 400 discussed above may optionally continue with the optional steps of process 700.

The process 700 may begin with determining based on historical data for a particular user that user visited a webpage associated with a first node at a first time (702). In one implementation, a consumer may visit webpages associated with nodes according to the following sequence:

"1" ⟶ "2" ⟶ "5" ⟶ "2" ⟶ "6".

The consumer data management circuitry 214 may determine from the sequence above that the consumer visited a webpage associated with node "2" at a particular time. The process 700 may continue with determining based on the historical data for the particular user that user visited the same webpage associated with the first node after the first time, wherein the user visited one or more webpages associated with nodes different from the first node after the first time and before visiting the same webpage after the first time (704). For example, the consumer data management circuitry 214 may determine that the consumer visited the webpage associated with node "2" at a second time after the particular time. The consumer management circuitry may also determine that the consumer visited one or more webpages between the visit at the particular time and the visit at the second time after the particular time. For example, with reference to the example above, the consumer data management circuitry 214 may determine that the consumer visited a webpage associated with the node "5" at a time between the particular time and the second time. In some implementations, the consumer data management circuitry 214 may determine that the consumer visited multiple nodes between the particular time and the second time.

The process 700 may end with filtering the user visits to the same website associated with the first node after the first time and the consumer visits to the one or more webpages associated with the nodes different from the first node such that the filtered visits are not available as historical data for the user (706). For example, with reference to the example above, the consumer data management system may filter the sequence above to remove the "5" node and the second visit of the "2" node. An exemplary filtered sequence is provided below:

$$\text{"1"} \longrightarrow \text{"2"} \longrightarrow \text{"6"}.$$

In one implementation, the filtering process above may be applied to historical data for a plurality of website consumers and/or users. In some implementations, multiple nodes visited between the particular time and the second time may be filtered or removed. In some implementations, the filtering process may also be applied to traffic data for the website. The filtered traffic data may then be used to generate a link graph and/or a transition matrix. Similarly the filtered historical data for consumers or users may be used to predict the consumer behaviors. The filtering process may significantly increase the speed at which the operations described above are performed. Additionally, the filtering may reduce the computational cost required for performing the operations above.

Example Actions and Optimizations Based on Consumer Behavior Predictions

In some implementations, the predications discussed herein may be provided to personnel of marketing and promotional service. The predictions may be used to optimize various business, performance, and marketing aspects. In some implementations, the optimizations are performed automatically by one or more servers 302, 308a, and 308b of the promotional and marketing service. FIG. 8 is a flow chart of exemplary process 800 directed towards performing one or more actions responsive to predicating programmatically expected consumer behavior.

The process 800 may begin with determining that the particular user is at webpage associated with a first node (802). For example, the process 800 may determine that the consumer is at a webpage associated with node "10." The process 800 continues with determining based on the link graph and historical data for the particular user that the particular user is likely to be redirected to a second webpage associated with a second node based on user interactions (804). For example, the prediction circuitry 214 may determine based on the link graph and/or the transition matrix and/or historical data for a particular consumer, that the particular consumer is likely to move from node "10" to exit node "5." Therefore, the system may determine that the consumer is leaving the website.

In one implementation, the process 800 may end with in response to determining that the particular user is likely to be redirected to a second webpage based on user interactions, performing a particular action (806). For example, the action may be to provide the consumer with additional discounts, redirect the consumer to a different webpage, or provide only highly relevant promotions and marketing materials to the consumer. In one implementation, the process 800 may end with responsive to determining that the particular user is likely to be redirected to a second webpage based on user interactions, presenting to a user device of the particular user an advertisement based on the particular user's historical data, wherein interaction with the advertisement redirects the particular user to a webpage of the website (808). In one implementation, the process 800 may provide the consumer with an advertisement that redirects the consumer device to a different webpage of the website in response to interactions with the advertisement. The advertisement may be selected based on the predicted consumer behavior and the historical data associated with the consumer. The advertisement may redirect the consumer device to a webpage associated with nodes that predictions indicate that consumers are likely to browse other webpages of the website after visiting the webpage. For example, interaction with the advertisement may reroute the consumer device to node "1." In one implementation, interaction with the advertisement may reroute the consumer to an additional discounts webpage. In one implementation, interaction with the advertisement may reroute the consumer to a purchase webpage. The example above demonstrates, that the process 800 may be configured to drive more traffic to websites, increase the number of purchases or conversions, and/or provide means to better target advertisements to consumers. While the actions and optimizations above are discussed with reference to a consumer, it should be understood that various optimizations may be performed on the website and the hardware components responsible for maintenance of the website based on the predictions.

In some implementations, the predictions described herein may be used to modify the layout of a website. In one implementation, modification of the layout may include changing how webpages of the website are interconnected with one another. For example, modifying the layout may include altering links on webpages of the website. The processes 900a and 900b are exemplary processes for modifying the layout of a website.

The process 900a begins with determining based on the link graph that modification of the website layout increases the programmatically expected traffic to the website, wherein the modification comprises providing one or more additional hyperlinks at a particular webpage, wherein the hyperlinks redirect user devices to a different webpage in response to user interaction (902). For example, the process 900a may determine that adding an additional hyperlink to node "10" may derive more traffic to the website. In one implementations, adding an additional hyperlink to the webpage associated with node "10" may drive more traffic to the website because consumers may be less likely to exit the website after the hyperlink is added.

The process 900a may in response to the determining, providing the one or more additional hyperlinks at the particular webpage, wherein the hyperlinks redirect user devices to a different webpage in response to user interactions (904). For example, the process 900a may add an additional hyperlink to the webpage associated with node "10" that redirects the consumer to the webpage associated with node "1."

In some implementations, process 900b may be performed in parallel with process 900a. In some implementations, processes 900a and 900b may be combined. Similar to process 900a, process 900b begins with determining based on the link graph that modification of the website layout increases the programmatically expected traffic to the website, wherein the modification comprises removing one or more hyperlinks from a particular webpage, wherein the hyperlinks redirect user devices to a different webpage in response to user interactions (906). For example, the process 900b may determine that removing hyperlink between nodes "3" and "8" increases traffic to the website. In response to the determining, the process 900b may continue with removing the one or more additional hyperlinks from the particular webpage, wherein the hyperlinks redirect user devices to a different webpage in response to user interactions (908). For example, the process 900b may remove the hyperlink between nodes "3" and "8" from the webpage associated with node "3." These processes may be used to optimize the layout of the website to achieve different goals. In one implementation, the website layout may be optimized to drive more traffic to the website. In some implementations, the website layout may be optimized to enhance the user experience. In some implementations, the website layout may be optimized to increase the number of conversions or sales made through the website.

The predictions discussed herein may be utilized to optimize various hardware components associated with the website. For example, the predictions may be used estimate the required number of processors, servers, computers, and/or the like for performing operations associated with maintaining the website. In some implementations, process 400 may continue with optional processes 1000a and 1000b.

Process 1000a begins with determining based on the link graph that traffic to a website will meet a pre-specified configurable threshold (1002). For example, the process 1000a may determine based on the link graph and/or the transition matrix that the overall traffic to the website will increase. In response to the determining, the process 1000a may continue with deactivating one or more processors from processors of the computer server (1004). In one implementation, the process 1000a may determine that the overall traffic to the website will decrease based on the link graph. Accordingly, the required processors, servers, computers and/or the like for maintaining the website may be reduced. Accordingly, the process 1000a may deactivate one or more of the processors, computers, servers and/or the like.

The process 1000b may begin with determining based on the link graph that traffic to a website will meet a pre-specified configurable threshold (1006). For example, the process 100b may determine based on the link graph and/or the transition matrix that the website traffic will increase beyond a particular threshold. In one implementation, the increase in traffic may be due to layout modifications as described above. The thresholds may be defined based on the processing power required for maintaining the website based on different levels of traffic to the website. In response to the determining, adding additional processors configured to operate with processors of the computer server to perform operations that the computer server is programed to perform (1008). For example, response to determining that the traffic will increase to meet the threshold described above, the process 1000b may add and/or activate one or more processors, computers, servers and/or the like to perform operations that the computer server is programmed to perform. For example, these operations may comprise the operations of processes 400-800, 900a-900b, 1000a-1000b and/or the like.

In one implementation, the processes described above may determine an optimal number of processing servers for performing operations associated with maintaining the website based on the link graph. For example, the processes described above may determine based on the link graph and/or transition matrix that the optimal number of processing servers is 2. In turn, the processes described above may allocate the optimal number of servers for performing the operations associated with maintaining the website. For example, the processes described above may allocate server 302 and secondary server A 308a to perform operations associated with maintaining, running, and hosting the website. Similarly, if the optimal number of servers is determined to be 3, the processes discussed above may allocate sever 302, secondary server A 308a, and secondary server B 308b to perform operations associated with maintaining, running, and hosting the website. This in turn reduces the operational costs and power consumption while ensuring that additional processing power is add for periods of high computational stress.

In some implementations, the process 400 may continue with any of the optional steps of process 1100. The process 1100 may begin with determining an expected number of conversions based on the link graph (1102). For example, the link graph and/or the transition matrix may be used to calculate the probability of one or more consumers visiting the purchase webpage or visiting a confirmation of purchase webpage and/or a tracking webpage. Visiting the pages above may be indicative of a conversion or of a purchase. Accordingly, the process 1100 may determine based on the graph a probability or a likelihood of consumers making a purchase based on the probability that the consumers will be redirected to, or visit, particular webpages.

In one implementation, the process 1100 may continue with determining an expected revenue during a pre-specified period based on the link graph (1104). For example by determining the expected number of conversions or purchases for the consumers of promotional and marketing service, the overall expected revenue based on these purchases may be determined. The purchases expected to be made by consumers, according to predictions, may be aggregated to determine an overall sales volume and/or revenue.

In some implementations, the process 1100 may optionally determine a prediction specifying an expected number of sales for a seller during a pre-specified period of time based, at least in part. For example, the process 1100 may determine an expected number of sales by the promotional and marketing service based on a plurality of predictions for a plurality of consumers. In some implementations, the process 1100 may add or compile predictions for all consumers and potential consumers. In some implementations, the process 1100 may add or compile predictions for a group of consumers and/or potential consumers.

In one implementation, the process 1100 may optionally continue with providing an advertisement to the first consumer and not providing an advertisement to the second consumer, based, at least in part, consumer predictions. For example, with the reference to the examples above, predictions may specify that the first consumer is likely to purchase or accept more promotions than the second consumer. Similarly, the predictions may indicate that the first consumer is more likely to visit a checkout page, sales page, tracking shipment page, and/or the like. Accordingly, the first consumer may be targeted for advertisements. For example, the process 1100 may provide an advertisement to the first consumer and not provide an advertisement to the second consumer. Alternatively, advertisement efforts and campaign may target consumers less likely to make a purchase, in order to increase the likelihood of these consumers making a purchase. For example, the process 1100 may provide an advertisement to the second consumer and not provide an advertisement to the first consumer.

In other implementations, the process 1100 may alternatively and optionally continue with providing advertisements to the first consumer at a different rate from providing advertisements to the second consumer, based, at least in part, on the predictions described above. For example, with the reference to the examples above, predictions may specify that the first consumer is likely to purchase or accept more promotions than the second consumer. Similarly, the predictions may indicate that the first consumer is more likely to visit a checkout page, sales page, tracking shipment page, and/or the like. Accordingly, the first consumer may be targeted for advertisements more than the second consumer. For example, the process 1100 may provide advertisements to the first consumer at a higher rate than providing advertisements to the second consumer. Alternatively, advertisement and campaign efforts may target consumers less likely to make a purchase, in order to increase the likelihood of these consumers making a purchase. For example, the process 1100 may provide advertisements to the second consumer at a higher rate than the first consumer.

In some implementations, the process 1100 may continue with determining an expected trend for a group of users based on the link graph (1106). For example, the process 1100 may determine that a group of consumers belonging to a certain demographic (age group, location, etc. . . . ) may be more likely to navigate the website in a different manner. Weights of the link graph and/or transition matrix may be optimized for different groups. The trend information for a particular group may be used to better target advertisements to consumers belonging to that group.

In one implementation, the process 1100 may continue with determining an optimized inventory level based on the link graph (1108). For example, the optimized inventory level may be determined based on the predicted conversions, sales, and/or purchases associated consumers. For example, once a prediction specifying the expected number of sales through the website during a pre-specified period is determined, the process 1100 may maintain an inventory level of items based on the expected sales during the pre-specified period. Naturally, this reduces the costs associated with, for example, storage. In turn, the overall revenue is increased. The predictions may be used to optimize various other business, marketing, and targeting aspects similar to the aspects discussed herein.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML webpage) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one non-transitory memory comprising program code, wherein the at least one non-transitory memory and the program code are configured to, with the at least one processor, cause the apparatus to:
   generate a link graph for a website comprising a plurality of webpages, the link graph comprising a plurality of nodes and a plurality of links, wherein a node of the plurality of nodes represents a webpage of the plurality of webpages and a link of the plurality of links represents a hyperlink of one or more hyperlinks;
   modify the link graph by eliminating those links of the plurality of links from the link graph that are associated with a desired computational expense below a first threshold or a desired accuracy below a second threshold; and
   generate a programmatically expected path for a particular user through the link graph based at least in part on a number of times each link associated with a first node was accessed.

2. The apparatus of claim 1, wherein the link graph is generated based at least in part on data comprising the one or more hyperlinks associated with the plurality of webpages.

3. The apparatus of claim 2, wherein the link graph is further generated based at least in part on historical data associated with the plurality of webpages.

4. The apparatus of claim 1, wherein each link is associated with a weight value.

5. The apparatus of claim 4, wherein the weight value represents a number of times a hyperlink represented by the link was accessed by a user device.

6. The apparatus of claim 5, wherein the weight value represents a normalized count of the number of times a hyperlink represented by the link was accessed by a user device.

7. The apparatus of claim 1, wherein generating the programmatically expected path for the particular user is further based at least in part on historical data, retrieved from a database, for the particular user of the website.

8. The apparatus of claim 4, wherein generating the programmatically expected path for the particular user comprises:
calculating a transition probability based on a ratio of weight values between the first node, a second node, and a sum of all weight values for transitions from the first node to any other node of the link graph.

9. The apparatus of claim 8, wherein generating the programmatically expected path for the particular user is further based at least in part on the transition probability.

10. The apparatus of claim 8, wherein the transition probability between the first node and the second node represents a likelihood that the particular user will be redirected from a webpage represented by the first node to a webpage represented by the second node.

11. The apparatus of claim 4, wherein a prediction model configured to generate one or more predictions associated with the website is trained based at least in part on one or more of: (i) the weight value associated with each link, (ii) the link graph, and (iii) historical data.

12. A computer-implemented method comprising:
generating a link graph for a website comprising a plurality of webpages, the link graph comprising a plurality of nodes and a plurality of links, wherein a node of the plurality of nodes represents a webpage of the plurality of webpages and a link of the plurality of links represents a hyperlink of one or more hyperlinks;
modifying the link graph by eliminating those links of the plurality of links from the link graph that are associated with a desired computational expense below a first threshold or a desired accuracy below a second threshold; and
generating a programmatically expected path for a particular user through the link graph based at least in part on a number of times each link associated with a first node was accessed.

13. The computer-implemented method of claim 12, wherein the link graph is generated based at least in part on data comprising the one or more hyperlinks associated with the plurality of webpages.

14. The computer-implemented method of claim 13, wherein the link graph is further generated based at least in part on historical data associated with the plurality of webpages.

15. The computer-implemented method of claim 12, wherein each link is associated with a weight value.

16. The computer-implemented method of claim 15, wherein the weight value represents a number of times a hyperlink represented by the link was accessed by a user device.

17. The computer-implemented method of claim 16, wherein the weight value represents a normalized count of the number of times a hyperlink represented by the link was accessed by a user device.

18. The computer-implemented method of claim 12, wherein generating the programmatically expected path for the particular user is further based at least in part on historical data, retrieved from a database, for the particular user of the website.

19. The computer-implemented method of claim 15, wherein generating the programmatically expected path for the particular user comprises:
calculating a transition probability based on a ratio of weight values between the first node, a second node, and a sum of all weight values for transitions from the first node to any other node of the link graph; and
generating the programmatically expected path for the particular user is further based at least in part on the transition probability.

20. A computer program product, the computer program product comprising at least one non-transitory computer-readable storage medium having computer-readable program code portions stored therein, the computer-readable program code portions configured to:
generate a link graph for a website comprising a plurality of webpages, the link graph comprising a plurality of nodes and a plurality of links, wherein a node of the plurality of nodes represents a webpage of the plurality of webpages and a link of the plurality of links represents a hyperlink of one or more hyperlinks;
modify the link graph by eliminating those links of the plurality of links from the link graph that are associated with a desired computational expense below a first threshold or a desired accuracy below a second threshold; and
generate a programmatically expected path for a particular user through the link graph based at least in part on a number of times each link associated with a first node was accessed.

* * * * *